United States Patent
Ikemoto

(10) Patent No.: US 9,435,307 B2
(45) Date of Patent: Sep. 6, 2016

(54) COMBUSTION PRODUCT PRODUCTION AMOUNT ESTIMATION DEVICE, DEPOSIT SEPARATION AMOUNT ESTIMATION DEVICE, DEPOSIT ACCUMULATION AMOUNT ESTIMATION DEVICE, AND FUEL INJECTION CONTROL DEVICE OF INTERNAL COMBUSTION ENGINE

(75) Inventor: Masato Ikemoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 945 days.

(21) Appl. No.: 13/696,767

(22) PCT Filed: Apr. 25, 2011

(86) PCT No.: PCT/JP2011/060027
§ 371 (c)(1),
(2), (4) Date: Nov. 7, 2012

(87) PCT Pub. No.: WO2012/147144
PCT Pub. Date: Nov. 1, 2012

(65) Prior Publication Data
US 2013/0054123 A1 Feb. 28, 2013

(51) Int. Cl.
*G06F 17/00* (2006.01)
*F02M 61/18* (2006.01)
*F02D 41/40* (2006.01)
(Continued)

(52) U.S. Cl.
CPC ........ *F02M 61/1806* (2013.01); *F02D 41/221* (2013.01); *F02D 41/40* (2013.01); *F02M 65/00* (2013.01); *F02M 2200/06* (2013.01); *Y02T 10/44* (2013.01)

(58) Field of Classification Search
CPC ............. F02M 61/1806; F02M 65/00; F02M 2200/06; F02D 41/221; F02D 41/40; Y02T 10/44
See application file for complete search history.

(56) References Cited

U.S. PATENT DOCUMENTS

| | | | | |
|---|---|---|---|---|
| 6,988,490 | B2 * | 1/2006 | Satou | F02B 23/104 123/299 |
| 7,318,413 | B2 * | 1/2008 | Iwahashi | F02D 41/08 123/431 |
| 8,869,605 | B2 * | 10/2014 | Ikemoto | F02D 41/221 73/114.45 |

(Continued)

FOREIGN PATENT DOCUMENTS

| | | |
|---|---|---|
| JP | 2007-239686 A | 9/2007 |
| JP | 2007-321592 A | 12/2007 |

(Continued)

*Primary Examiner* — Mahmoud Gimie
*Assistant Examiner* — David Hamaoui
(74) *Attorney, Agent, or Firm* — Sughrue Mion, PLLC

(57) ABSTRACT

This invention relates to a deposit remove amount estimation device for estimating inlet and outlet deposit remove amounts by calculating an inlet deposit remove amount which is an amount of a removed combustion product among the combustion product accumulating on an injection hole inlet area and an outlet deposit remove amount which is an amount of a removed combustion product among the combustion product accumulating on an injection hole outlet area. In this invention, the inlet deposit remove amount is calculated on the basis of the inlet deposit accumulation amount which is an amount of the combustion product accumulating on the injection hole inlet area and the outlet deposit remove amount is calculated on the basis of the outlet deposit accumulation amount which is an amount of the combustion product accumulating on the injection hole outlet area.

6 Claims, 11 Drawing Sheets

(51) Int. Cl.
*F02M 65/00* (2006.01)
*F02D 41/22* (2006.01)

(56) References Cited

U.S. PATENT DOCUMENTS

| | | | |
|---|---|---|---|
| 2004/0035954 A1* | 2/2004 | Carlise | F02M 61/06 239/584 |
| 2008/0060259 A1* | 3/2008 | Breakspear | C07D 207/323 44/327 |
| 2008/0060608 A1* | 3/2008 | Breakspear | C10L 1/14 123/198 A |
| 2009/0000595 A1 | 1/2009 | Ashizawa et al. | |
| 2010/0049421 A1* | 2/2010 | Futonagane | F02D 41/1466 701/103 |
| 2010/0070158 A1 | 3/2010 | Futonagane et al. | |
| 2010/0094527 A1* | 4/2010 | Futonagane | F02D 35/025 701/103 |
| 2010/0163000 A1* | 7/2010 | Futonagane | F02D 41/22 123/478 |
| 2015/0300286 A1* | 10/2015 | Ikemoto | F02D 41/22 73/144.48 |

FOREIGN PATENT DOCUMENTS

| | | |
|---|---|---|
| JP | 2008-115824 A | 5/2008 |
| JP | 2008-196363 A | 8/2008 |
| JP | 2009-167935 A | 7/2009 |
| JP | 2009-257100 A | 11/2009 |
| JP | 2010-065537 A | 3/2010 |

* cited by examiner

COMBUSTION PRODUCT PRODUCTION AMOUNT ESTIMATION DEVICE, DEPOSIT SEPARATION AMOUNT ESTIMATION DEVICE, DEPOSIT ACCUMULATION AMOUNT ESTIMATION DEVICE, AND FUEL INJECTION CONTROL DEVICE OF INTERNAL COMBUSTION ENGINE

CROSS REFERENCE TO RELATED APPLICATIONS

This application is a National Stage of International Application No. PCT/JP2011/060027 filed Apr. 25, 2011, the contents of all of which are incorporated herein by reference in their entirety.

TECHNICAL FIELD

The invention relates to a combustion product production amount estimation device, a deposit separation amount estimation device, a deposit accumulation amount estimation device and a fuel injection control device of an internal combustion engine.

BACKGROUND ART

An internal combustion engine comprising fuel injectors positioned so as to directly inject the fuel into the respective combustion chambers is known. In such an engine, it is known that combustion products (i.e. matter derived from the combustion of the fuel) are produced and this combustion products accumulate on a fuel injector wall face (hereinafter, this wall face will be referred to as—injection hole wall face—) of an injection hole area (i.e. an area formed of an interior area of the fuel injection hole of the fuel injector, an exterior area of the fuel injection hole and adjacent to the inlet of the fuel injection hole and an exterior area of the fuel injection hole and adjacent to the outlet of the fuel injection hole). Then, when the combustion products accumulate on the injection hole wall face, even if a command for making the fuel injector inject the fuel having a desired amount is supplied to the fuel injector, the fuel having the desired amount may not be injected from the fuel injector. Then, when the fuel having the desired amount is injected from the fuel injector, the output property and the exhaust gas property of the engine may be decreased. In the fuel injection control device of the engine described in the Patent Document 1, when the amount of the combustion products accumulating on the injection hole wall face (hereinafter, the combustion products accumulating on the injection hole wall face will be referred to as—deposit—and the amount of the deposit will be referred to as—deposit accumulation amount—) is equal to or larger than a base amount, the fuel injection from the fuel injector is controlled so as to separate the deposit from the injection hole wall face.

In the fuel injection device described in the Patent Document 1, the deposit accumulation amount is used for judging if the deposit should be removed from the injection hole wall face. Therefore, in this Patent Document, it is necessary to estimate the deposit accumulation amount. In this regard, when an amount of the fuel actually injected from the fuel injector is referred to as actual fuel injection amount, an amount required as that of the fuel injected from the fuel injector is referred to as required fuel injection amount and a command value supplied to the fuel injector for inject the fuel having the required fuel injection amount from the fuel injector when the deposit accumulation amount is zero is referred to as fuel injection command value, in the Patent Document 1, the deposit accumulation amount is estimated on the basis of the difference between the actual and required fuel injection amounts when the actual fuel injection amount is smaller than the required fuel injection amount from the understanding that when the deposit has accumulated on the injection hole wall face, the actual fuel injection amount becomes smaller than the required fuel injection amount and as the deposit accumulation amount becomes large, the actual fuel injection amount becomes smaller than the required fuel injection amount. It should be noted that in this case, as the difference between the actual and required fuel injection amounts becomes large, it is estimated that the deposit accumulation amount is large.

CITATION LIST

Patent Literature 1: JP 2009-275100 A
Patent Literature 2: JP 2010-65537 A

SUMMARY OF INVENTION

1. Technical Problem

It has been found by the study of the inventor of this application that a metal component derivation combustion product is produced by the reaction of the metal component (for example, the zinc, the calcium, the magnesium, etc.) in the fuel with the combustion gas while at the injection hole inlet area (i.e. the injection hole area adjacent to the inlet of the fuel injection hole), for example, the combustion product such as the carbonate, the oxalate, etc. is produced and on the other hand, at the injection hole outlet area (i.e. the injection hole area adjacent to the outlet of the fuel injection hole), for example, the combustion product such as the lower carboxylate is produced.

Then, it has been found by the study of the inventor of this application that the influence exerted on the fuel injection (i.e. the injection of the fuel from the fuel injector) by the deposit accumulating on the injection hole inlet area (hereinafter, this deposit will be referred to as—inlet deposit—) is different from that exerted on the fuel injection by the deposit accumulating on the injection hole outlet area (hereinafter, this deposit will be referred to as—outlet deposit—). Therefore, in order to maintain the property relating to the fuel injection at a desired property, it is necessary to grasp these influences at the injection hole inlet and outlet areas separately. That is, it is necessary to grasp these influences at each area on which the deposit may accumulate. Then, in order to grasp these influences at each area, it is necessary to grasp the deposit accumulation amount at each area. That is, it is necessary to grasp the accumulation amount of the inlet deposit and the accumulation amount of the outlet deposit separately.

Then, the combustion product is produced continuously during the engine operation (i.e. during the operation of the engine) and therefore, in order to grasp the inlet and outlet deposit accumulation amounts, it is necessary to estimate an amount of the combustion product continuously produced at the injection hole inlet area (hereinafter, this amount will be referred to as—inlet combustion product production amount) and an amount of the combustion product continuously produced at the injection hole outlet area (hereinafter, this amount will be referred to as—outlet combustion product production amount).

Further, if all combustion products continuously produced during the engine operation accumulate on the injection hole wall face and the combustion product once accumulating on the injection hole wall face (i.e. the deposit) is not removed from the injection hole inlet or outlet wall face, the inlet and outlet deposit accumulation amounts can be obtained from the inlet and outlet combustion product production amounts. However, in fact, while the combustion product is continuously produced, the deposit may be removed from the injection hole inlet or outlet wall face. Therefore, in order to grasp the inlet and outlet deposit accumulation amounts, it is necessary to estimate the remove amounts of the deposits at the injection hole inlet and outlet areas.

In this regard, the object of this invention is to estimate the combustion product production amount, the deposit remove amount and the deposit accumulation amount at each area.

2. Solution to Problem

The invention of this application relates to a combustion product production amount estimation device of an internal combustion engine having a fuel injector. The combustion product production amount estimation device estimates an inlet combustion product production amount and an outlet combustion product production amount by calculating those amounts. The inlet combustion product production amount is an amount of combustion product produced due to the combustion of fuel at an injection hole inlet area constituted by: an area that is inside of a fuel injection hole of the fuel injector and that is at an inlet side of the fuel injection hole; and an area that is outside of the fuel injection hole and that is adjacent to an inlet of the fuel injection hole. The outlet combustion product production amount is an amount of combustion product produced due to the combustion of fuel at an injection hole outlet area constituted by: an area that is inside of the fuel injection hole and that is at an outlet side of the fuel injection hole; and an area that is outside of the fuel injection hole and that is adjacent to an outlet of the fuel injection hole. Then, in this invention, a temperature of the injection hole inlet area and a temperature of the injection hole outlet area are obtained separately. Then, the inlet combustion product production amount is calculated on the basis of a temperature of the injection hole inlet area, and the outlet combustion product production amount is calculated on the basis of a temperature of the injection hole outlet area.

According to this invention, the combustion product production amounts at the area surrounding the inlet of the fuel injection hole (i.e. the injection hole inlet area) and at the area surrounding the outlet of the fuel injection hole (i.e. the injection hole outlet area) can be estimated separately. That is, according to this invention, the combustion product production amount can be estimated at each area.

Further, another invention of this application relates to a deposit remove amount estimation device of an internal combustion engine having a fuel injector. The deposit remove amount estimation device estimates an inlet deposit remove amount and an outlet deposit remove amount by calculating those amounts. The inlet deposit remove amount is an amount of removed combustion product among combustion product accumulating on an injection hole inlet area constituted by: an area that is inside of a fuel injection hole of the fuel injector and that is at an inlet side of the fuel injection hole; and an area that is outside of the fuel injection hole and that is adjacent to an inlet of the fuel injection hole. The outlet deposit remove amount is an amount of removed combustion product among combustion product accumulating on an injection hole outlet area constituted by: an area that is inside of the fuel injection hole and that is at an outlet side of the fuel injection hole; and an area that is outside of the fuel injection hole and that is adjacent to an outlet of the fuel injection hole. Then, in this invention, the inlet deposit remove amount is calculated on the basis of an inlet deposit accumulation amount defined as an amount of combustion product accumulating on the injection hole inlet area, and the outlet deposit remove amount is calculated on the basis of an outlet deposit accumulation amount defined as an amount of combustion product accumulating on the injection hole outlet area.

According to this invention, the deposit remove amounts at the injection hole inlet and outlet areas can be estimated separately. That is, according to this invention, the deposit remove amount can be estimated at each area.

Further, another invention of this application relates to a deposit accumulation amount estimation device. The deposit accumulation amount estimation device estimates an inlet deposit accumulation amount and an outlet deposit accumulation amount by calculating those amounts. The inlet deposit accumulation amount is an amount of combustion product accumulating on an injection hole inlet area, and the outlet deposit accumulation amount is an amount of combustion product accumulating on an injection hole outlet area. Then, in this invention, the inlet deposit accumulation amount is calculated by subtracting the inlet deposit remove amount calculated by the deposit remove amount estimation device described above from the inlet combustion product production amount calculated by the combustion product production amount estimation device described above, and the outlet deposit accumulation amount is calculated by subtracting the outlet deposit remove amount calculated by the deposit remove amount estimation device described above from the outlet combustion product production amount calculated by the combustion product production amount estimation device described above.

According to this invention, the deposit accumulation amounts at the injection hole inlet and outlet areas can be estimated separately. That is, according to this invention, the deposit accumulation amount can be estimated at each area.

It should be noted that in the case that the combustion product accumulating on the injection hole inlet area decomposes when the temperature of the injection hole inlet area becomes equal to or higher than a certain temperature, it is preferred that a temperature of decomposition of the combustion product accumulating on the injection hole inlet area is set as an inlet deposit decomposition temperature, and the inlet deposit accumulation amount is calculated as zero upon a temperature of the injection hole inlet area is equal to or higher than the inlet deposit decomposition temperature.

According to this, even if the temperature of the injection hole inlet area becomes equal to or higher than the inlet deposit decomposition temperature and then, the condition that the combustion product accumulating on the injection hole inlet area decomposes occurs, the exact inlet deposit accumulation amount can be calculated.

Further, in the case that the combustion product accumulating on the injection hole outlet area decomposes when the temperature of the injection hole outlet area becomes equal to or higher than a certain temperature, it is preferred that a temperature of decomposition of the combustion product accumulating on the injection hole outlet area is set as an outlet deposit decomposition temperature, and the outlet deposit accumulation amount is calculated as zero upon the temperature of the injection hole outlet area is equal to or higher than the outlet deposit decomposition temperature.

According to this, even if the temperature of the injection hole outlet area becomes equal to or higher than the outlet deposit decomposition temperature and then, the condition that the combustion product accumulating on the injection hole outlet area decomposes occurs, the exact outlet deposit accumulation amount can be calculated.

Further, in the case that a fuel injection control device of an internal combustion engine provides a fuel injection command value that is a command value to be provided toward the fuel injector to inject the fuel from the fuel injector is set at a base fuel injection command value so as to correspond to a required fuel injection amount, and the base fuel injection command value being provided to the fuel injector, it is preferred that the base fuel injection command value is corrected depending on the inlet deposit accumulation amount.

According to this, even if the combustion product has accumulated on the injection hole inlet area, the fuel having the required fuel injection amount can be injected from the fuel injector. That is, even if the base fuel injection command value corresponding to the required fuel injection amount is supplied to the fuel injector when the combustion product has accumulated on the injection hole inlet area, the fuel having the required fuel injection amount is not injected from the fuel injector due to the influence of the combustion product accumulating on the injection hole inlet area. That is, the amount of the fuel actually injected from the fuel injector becomes different from the required fuel injection amount. Then, the degree of this difference varies depending on the amount of the combustion product accumulating on the injection hole inlet area (i.e. the inlet deposit accumulation amount). Therefore, even if the combustion product has accumulated on the injection hole inlet area, the fuel having the required fuel injection amount can be injected from the fuel injector by correcting the base fuel injection command value depending on the inlet deposit accumulation amount.

Further, in the case that a fuel injection control device of an internal combustion engine controls a fuel injection pressure that is a pressure of fuel injected from a fuel injector to a base fuel injection pressure set as a target fuel injection pressure, it is preferred that the base fuel injection pressure is increased when the outlet deposit accumulation amount is larger than the inlet deposit accumulation amount, and the fuel injection pressure is controlled to the increased base fuel injection pressure.

According to this, the atomization of the fuel injected from the fuel injector when the combustion product has accumulated on the injection hole outlet area can be facilitated efficiently. That is, if the combustion product has accumulated on the injection hole outlet area, the atomization degree of the fuel injected from the fuel injector (hereinafter, this fuel will be referred to as—injected fuel—) decreases. On the other hand, if the fuel injection pressure increases, the atomization of the injected fuel is facilitated. Therefore, in the case that the combustion product has accumulated on the injection hole outlet area, if the fuel injection pressure is increase, the decrease of the atomization degree of the injected fuel due to the combustion product accumulating on the injection hole outlet area is compensated. On the other hand, in the case that the outlet deposit accumulation amount is equal to or smaller than the inlet deposit accumulation amount, the compensation effect relative to the decrease of the atomization degree of the injected fuel by the increase of the fuel injection pressure is relatively low. Therefore, under the condition that the outlet deposit accumulation amount is larger than the inlet deposit accumulation amount and therefore, the compensation effect relative to the decrease of the atomization degree of the injected fuel by the increase of the fuel injection pressure is relatively high, the fuel injection pressure is increased by increasing the base fuel injection pressure and therefore, the atomization of the injected fuel can be facilitated efficiently.

Further, it is preferred that a fuel injection control device of an internal combustion engine increases a fuel injection pressure, which is defined as a pressure of fuel injected from a fuel injector, to a pressure allowing to remove a combustion product accumulating on an injection hole outlet area from the injection hole outlet area when the inlet deposit accumulation amount is equal to or smaller than a predetermined inlet deposit accumulation amount and the outlet deposit accumulation amount is equal to or larger than a predetermined outlet deposit accumulation amount.

According to this, the combustion product accumulating on the injection hole outlet area can be removed from the injection hole outlet area efficiently. That is, if the fuel injection pressure increases to the relatively high pressure, the combustion product accumulating on the injection hole outlet area can be removed from the injection hole outlet area. In this regard, in the case that the inlet deposit accumulation amount is relatively large, the remove effect of the combustion product accumulating on the injection hole outlet area by the increase of the fuel injection pressure is relatively low. Therefore, under the condition that the inlet deposit accumulation amount is equal to or smaller than the predetermined inlet deposit accumulation amount and therefore, the remove effect of the combustion product accumulating on the injection hole outlet area by the increase of the fuel injection pressure is relatively high, the fuel injection pressure is increased to the pressure which can remove the combustion product accumulating on the injection hole outlet area from the injection hole outlet area and therefore, the combustion product accumulating on the injection hole outlet area can be removed from the injection hole outlet area efficiently.

DESCRIPTION OF EMBODIMENTS

Figure 1:
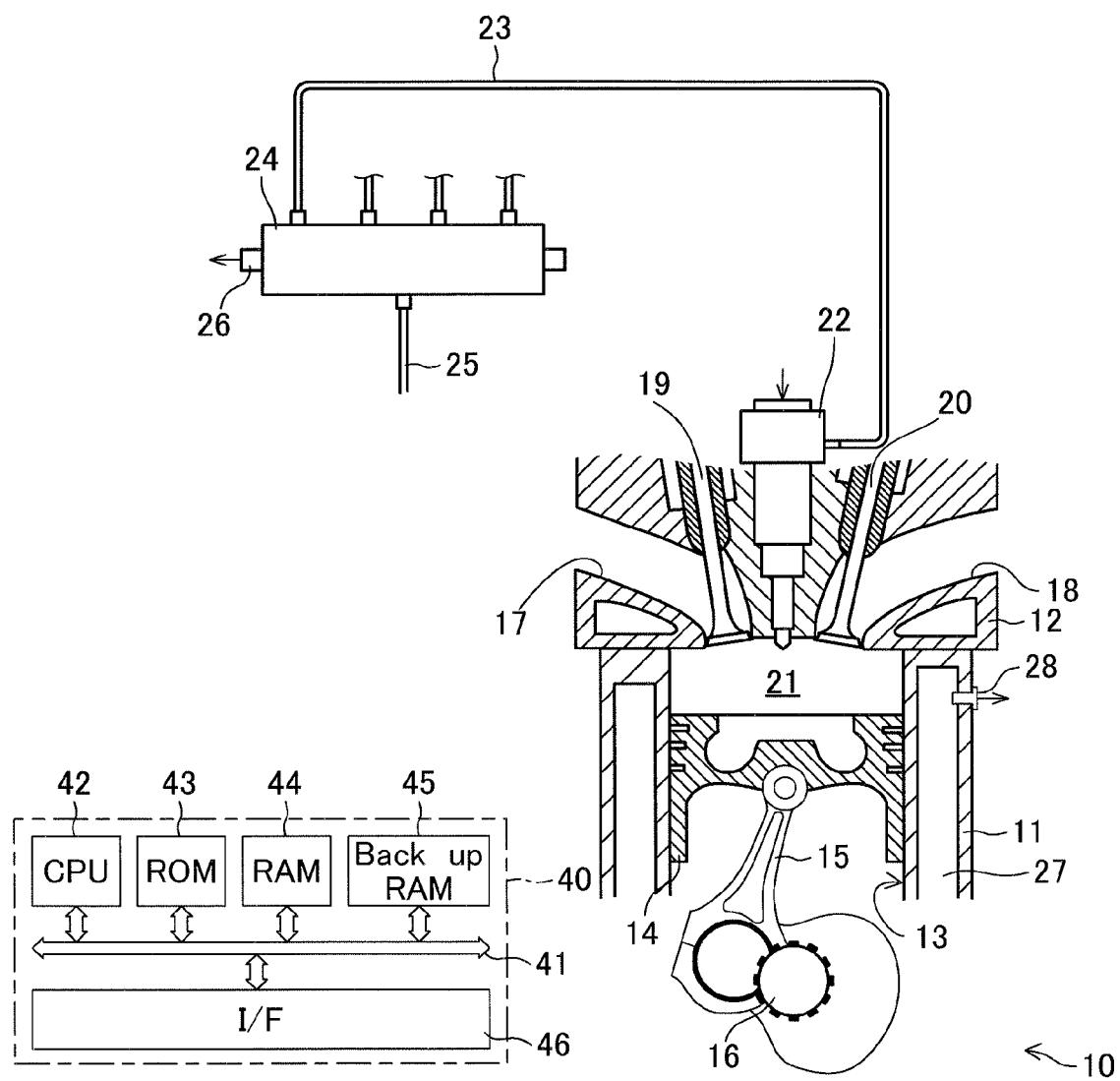
FIG. 1 is a view showing an internal combustion engine which the invention is applied.

Below, embodiments of the invention will be explained referring to the drawings. First, a constitution of an internal combustion engine which the invention is applied will be explained. This engine is shown in FIG. 1. In FIG. 1, 10 denotes a body of the engine, 11 denotes a cylinder block and 12 denotes a cylinder head. Cylinder bores 13 are formed in the cylinder block 11. A piston is positioned in the cylinder bore 13. The piston 14 is connected to a crank shaft 16 via a connection rod 15. On the other hand, intake and exhaust ports 17 and 18 are formed in the cylinder head 12. Intake valves 19 for opening and closing the intake ports 17 and exhaust valves 20 for opening and closing the exhaust ports 18 are positioned in the cylinder head 12. A combustion chamber 21 is defined by an upper wall face of the piston 14, an inner periphery wall face of the cylinder bore 13 and a lower wall face of the cylinder head 12.

It should be noted that the intake port 17 is connected to an intake pipe (not shown) via an intake manifold (not shown) and constitutes a part of an intake passage. On the other hand, the exhaust port 18 is connected to an exhaust pipe (not shown) via an exhaust manifold (not shown) and constitutes a part of an exhaust passage.

Figure 2:
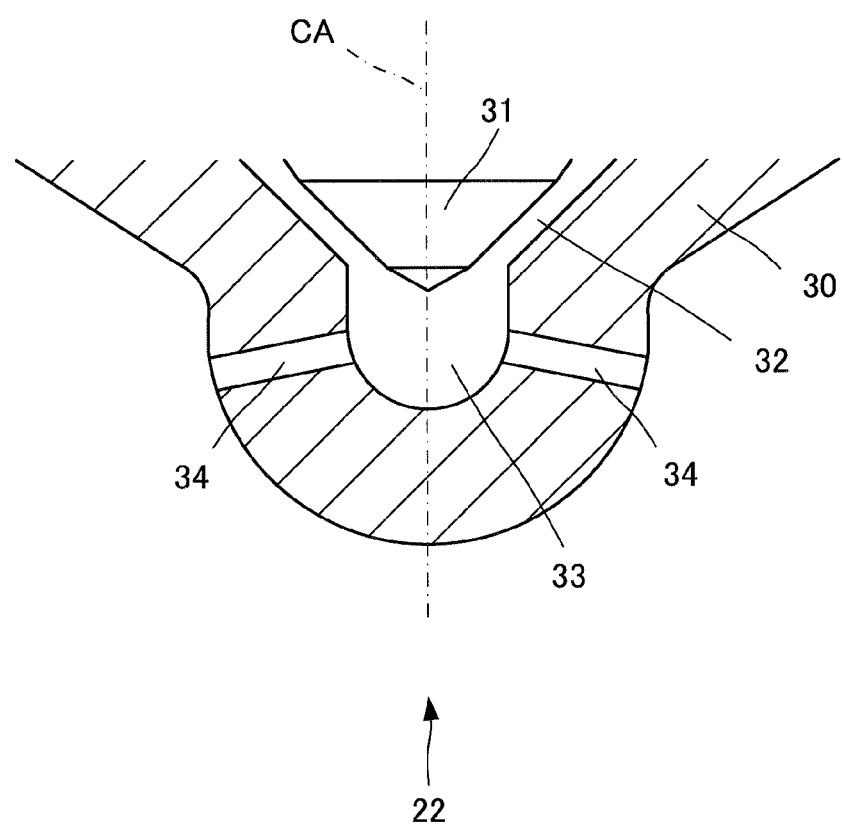
FIG. 2 is a view showing a tip portion of a fuel injector of the engine shown in FIG. 1.

Further, fuel injectors 22 are positioned on the cylinder head 12. As shown in FIG. 2, the fuel injector has a nozzle 30 and a needle 31. A cavity (hereinafter, will be referred to as—interior cavity—) is formed in the interior of the nozzle 30. The needle 31 is housed in this interior cavity such that the needle 31 can displace along a central axis CA of the nozzle 30 (i.e. a central axis of the fuel injector 22). A tip of the needle 31 is tapered. When the needle 31 is housed in the interior cavity of the nozzle 30, a fuel passage 32 for making the fuel flow between an inner periphery wall face of the nozzle 30 (i.e. a wall face defining the interior cavity of the nozzle 30) and an outer periphery wall face of the needle 31 is formed. The fuel passage 32 at the tip of the nozzle 30 forms a so-called suck 33 (hereinafter, the fuel passage 32 should be construed as a fuel passage except for this suck 33). A plurality of fuel injection holes 34 are formed in the tip of the nozzle 30. These fuel injection holes 34 communicate the suck 33 in the nozzle 30 (i.e. in the fuel injector 22) with the exterior of the nozzle 30 (i.e. the exterior of the fuel injector 22).

When the needle 31 is located in the nozzle 30 such that the outer periphery wall face of the tapered tip of the needle 31 abuts to the inner periphery wall face of the tip of the nozzle 30, the communication between the suck 33 and the fuel passage 32 is blocked. At this time, no fuel is injected from the fuel injection holes 34 of the fuel injector 22. On the other hand, when the needle 31 displaces in the nozzle 30 such that the outer periphery wall face of the tapered tip of the needle 31 is away from the inner periphery wall face of the tip of the nozzle 30, the communication between the suck 33 and the fuel passage 32 is established and then, the fuel flows from the fuel passage 32 into the suck 33. Then, the fuel flowing into the suck 33 flows into the fuel injection holes 34 via the inlets thereof and then, the fuel is injected from the outlets of the fuel injection holes via the fuel injection holes 34.

The fuel injectors 22 are positioned on the cylinder head 12 so as to inject the fuel directly into the respective combustion chambers 21. In other words, the fuel injectors 22 are positioned on the cylinder head 12 such that the fuel injection holes thereof expose to the interiors of the respective combustion chambers 21.

The fuel injector 22 is connected to an accumulation chamber (i.e. a so-called common rail) 24 via a fuel supply passage 23. The accumulation chamber is connected to a fuel tank (not shown) via a fuel supply passage 25. The fuel is supplied from the fuel tank to the accumulation chamber 24 via the fuel supply passage 25. Then, the fuel having a high pressure is stored in the accumulation chamber 24. The fuel having a high pressure is supplied from the accumulation chamber 24 to the fuel injector 22 via the fuel supply passage 23. A pressure sensor 26 for detecting the pressure of the fuel in the accumulation chamber is positioned in the accumulation chamber 24.

A coolant water passage 27 through which a coolant water flows is formed in the cylinder block 11. The coolant water passage 27 is formed so as to surround the cylinder bore 13. Therefore, at least the interior of the combustion chamber 21 is cooled by the coolant water flowing through the coolant water passage 27. A temperature sensor 28 for detecting a temperature of the coolant water flowing through the coolant water passage 27 is positioned in the cylinder block 11.

The engine has an electronic control unit 40. The electronic control unit 40 is comprised of a micro-computer and has a CPU (microprocessor) 42, a ROM (read only memory) 43, a RAM (random access memory) 44, a back-up RAM 45 and an interface 46 which are connected to each other by a bidirectional bus 41. The interface 46 is connected to the fuel injectors 22, the pressure sensor 26 and the temperature sensor 28. The electronic control unit 40 controls the operation of the fuel injectors 22 and receives an output value corresponding to the pressure of the fuel from the pressure sensor 26 and an output value corresponding to the temperature of the coolant water from the temperature sensor 28.

Next, embodiments of a combustion product production amount estimation according to the invention will be explained. It should be noted that in the following explanation, the "injection hole wall face" corresponds to a fuel injector wall face defining the fuel injection hole of the fuel injector, the "inlet side injection hole wall face" corresponds to an injection hole wall face near the inlet of the fuel injection hole out of the injection hole wall face, the "outlet side injection hole wall face" corresponds to an injection wall face near the outlet of the fuel injection hole out of the injection hole wall face, the "injection hole inlet adjacent wall face" corresponds to a fuel injector wall face adjacent to the inlet side injection hole wall face, the "injection hole outlet adjacent wall face" corresponds to a fuel injector wall face adjacent to the outlet side injection hole wall face, the "injection hole inlet wall face" corresponds to a wall face constituted by the inlet side injection hole wall face and the injection hole inlet adjacent wall face, and the "injection hole outlet wall face" corresponds to a wall face constituted by the outlet side injection hole wall face and the injection hole outlet adjacent wall face. The "injection hole inlet area" corresponds to an area surrounding the injection hole inlet wall face and the "injection hole outlet area" corresponds to an area surrounding the injection hole outlet wall face. The "combustion product" corresponds to matter derived from the combustion of the fuel, the "inlet deposit" corresponds to a combustion product accumulating on the injection hole inlet area and the "outlet deposit" corresponds to a combustion product accumulating on the injection hole outlet area. The "combustion gas" corresponds to a gas produced by the combustion of the fuel in the combustion chamber, the "fuel injection" corresponds to an injection of the fuel from the fuel injection hole of the fuel injector and the "fuel injection pressure" corresponds to a pressure of the fuel injected from the fuel injection hole of the fuel injector. The "injection hole temperature" corresponds to a temperature in the interior of the fuel injection hole of the fuel injector, the "injection hole inlet temperature" corresponds to a temperature of the injection hole inlet area and the "injection hole temperature" corresponds to a temperature of the injection hole outlet area.

In one of the embodiments of the combustion product production amount estimation of this invention, a production amount XPin of the combustion product produced at the injection hole inlet area during a predetermined period (i.e. a predefined period) is calculated according to the following formula 1 (hereinafter, this production amount will be referred to as—inlet combustion product newly production amount) and a production amount XPout of the combustion product produced at the injection hole outlet area during the predetermined period is calculated according to the following formula 2 (hereinafter, this production amount will be referred to as—outlet combustion product newly production amount). It should be noted that the predetermined period is not limited to any particular period, may be set optionally and for example, may be a period between two fuel injections which are performed continuously in a particular fuel injector.

$$XPin = Cm \times Ain \times Tin \quad (1)$$

$$XPout = Cm \times Aout \times Tout \quad (2)$$

In the formulas 1 and 2, "Cm" is a concentration of the metal components in the fuel (hereinafter, this concentration will be simply referred to as—metal component concentration—). This metal component concentration may be a previously measured concentration or a concentration measured appropriately during the engine operation. In the formula 1, "Tin" is an injection hole inlet temperature at a particular timing during the predetermined period. In the formula 2, "Tout" is an injection hole outlet temperature at a particular timing during the predetermined period. In the formula 1, "Ain" is a coefficient adapted such that the exact inlet combustion product newly production amount relating to the metal component concentration Cm and the injection hole inlet temperature Tin is calculated. In the formula 2, "Aout" is a coefficient adapted such that the exact outlet combustion product newly production amount relating to the metal component concentration Cm and the injection hole outlet temperature Tout is calculated.

Next, advantages of the combustion product production amount estimation of this embodiment will be explained. It is known that in the engine that the fuel injector is positioned so as to inject the fuel directly into the combustion chamber, the combustion product accumulates on the injection hole outlet adjacent wall face. Further, it has been found by the study of the inventor of this application that the combustion product derived from the metal components (this product is, for example, lower carboxylic acid, carbonate, oxalate, etc. and will be referred to as—metal derivation product—) is produced by the reaction of the metal components in the fuel (these components are, for example, zinc, calcium, magnesium, etc.) with the combustion gas and then, this metal derivation product accumulates on the injection hole outlet adjacent wall face. Further, it has been found by the study of the inventor of this application that the metal derivation product accumulates on the injection hole wall face and the injection hole inlet adjacent wall face.

Next, the metal derivation product will be explained briefly. Conventionally, it has been realized that no combustion product accumulates on the injection hole wall face and the injection hole inlet adjacent wall face. In this regard, as explained above, it has been found by the study of the inventor of this application that the combustion product such as the metal derivation product accumulates on the injection hole outlet adjacent wall face as well as the injection hole wall face and the injection hole inlet adjacent wall face. It can be presumed that the reason why the metal derivation product accumulates on the injection hole wall face and the injection hole inlet adjacent wall face is the following. That is, in the case that the fuel injector is positioned on the engine such that the fuel injector injects the fuel directly into the combustion chamber, that is, the fuel injection hole of the fuel injector is exposed to the interior of the combustion chamber, the combustion gas enters into the fuel injection hole and then, this combustion gas reacts with the fuel in the fuel injection hole and at the area adjacent to the inlet thereof and thereby, the metal derivation product is produced. Then, the adherence force of the metal derivation product to the wall face is relatively strong and therefore, the metal derivation product adheres to and accumulates on the injection hole wall face and the injection hole inlet adjacent wall face although there is a strong flow of the fuel in the fuel injection hole and at the inlet thereof. This can be presumed as the reason why the metal derivation product accumulates on the injection hole wall face and the injection hole inlet adjacent wall face.

When the combustion product including the metal derivation product (hereinafter, the term "combustion product" means—combustion product including the metal derivation product) has accumulated on the injection hole outlet adjacent wall face, the injection hole wall face and the injection hole inlet adjacent wall face (hereinafter, these wall faces will be collectively simply referred to as—wall face—), the combustion product which has accumulated on the wall face (hereinafter, the combustion product which has accumulates on the wall face will be referred to as—deposit—) may blocks the flow of the fuel. Therefore, even if the command value for essentially making the fuel injector inject the fuel having a required amount (hereafter, this amount will be referred to as—required fuel injection amount—) is supplied to the fuel injector, there is a possibility that the fuel having the required fuel injection amount is not injected from the fuel injector.

In this regard, in the case that the fuel having the required fuel injection amount is not injected from the fuel injector, there is a possibility that the output and exhaust properties of the engine decrease. Therefore, in order to restrict the decrease of or improve the output and exhaust properties of the engine, it is essential or at least useful to know the possibility that such a decrease occurs. In this regard, in order to know the possibility that such a decrease occurs, it is necessary to know the exact amount of the deposit accumulating on the wall face (hereinafter, this amount will be referred to as—deposit accumulation amount—).

On the other hand, the deposit accumulation amount differs depending on the shape of the wall face and the temperature of the atmosphere surrounding the wall face. In this regard, the shapes of the injection hole inlet and outlet wall faces are often different from each other and the injection hole inlet and outlet temperatures are often different from each other. Further, the influences of the inlet and outlet deposits to the property relating to the fuel injection are different from each other. For example, the influence of the inlet deposit to the fuel injection amount is larger than that of the outlet deposit to the fuel injection amount. On the other hand, the influence of the outlet deposit to the atomization of the injected fuel is larger than that of the inlet deposit to the atomization of the injected fuel. Further, the easiness of the remove of the outlet deposit from the injection hole outlet area is higher than that of the inlet deposit from the injection hole inlet area. In consideration of the above matter, in order to appropriately restrict the decrease of or improve the output and exhaust properties of the engine, it is necessary to separate the deposit accumulation amount into an amount of the deposit accumulating on the injection hole inlet area (hereinafter, this amount will be referred to as—inlet deposit accumulation amount—) and an amount of the deposit accumulating on the injection hole outlet area (hereinafter, this amount will be referred to as—outlet deposit accumulation amount—).

During the engine operation (i.e. during the operation of the engine), the fuel is injected from the fuel injector in turn and therefore, the combustion product is produced in turn. In this regard, the thus produced combustion product accumulates on the wall face and thereby, the deposit is formed. Therefore, in order to know the inlet and outlet deposit accumulation amounts, respectively, it is necessary to know an amount of the combustion product produced in turn at the injection hole inlet area (i.e. an inlet combustion product newly production amount) and an amount of the combustion product produced in turn at the injection hole outlet area (i.e. an outlet combustion product newly production amount).

In this regard, the inlet combustion product newly production amount differs depending on the metal component concentration and the injection hole inlet temperature. Concretely, when the injection hole inlet temperature is constant, the inlet combustion product newly production amount becomes large as the metal component concentration becomes high. Further, when the metal component concentration is constant, the inlet combustion product newly production amount becomes large as the injection hole inlet temperature becomes high. Therefore, in order to calculate the exact inlet combustion product newly production amount, the metal component concentration and the injection hole inlet temperature should be considered for the calculation. For the same reason, in order to calculate the exact outlet combustion product newly production amount, the metal component concentration and the injection hole inlet temperature should be considered for the calculation.

In this regard, in the combustion product production amount of this embodiment, as shown in the formula 1, the inlet combustion product newly production amount XPin is calculated on the basis of the product of the metal component concentration Cm and the injection hole inlet temperature Tin. That is, the inlet combustion product newly production amount XPin is calculated using the metal component concentration Cm and the injection hole inlet temperature Tin as variables. Then, the inlet combustion product newly production amount XPin calculated by the formula 1 becomes large as the metal component concentration Cm becomes high and as the injection hole temperature Tin becomes high. That is, the matter that the inlet combustion product newly production amount becomes large as the metal component concentration becomes high or the injection hole inlet temperature becomes high is considered for the calculation of the inlet combustion product newly production amount by the formula 1. Therefore, the combustion product production amount estimation of this embodiment has an advantage that the exact inlet combustion product newly production amount can be calculated.

Further, in the combustion product production amount estimation of this embodiment, as shown in the formula 2, the outlet combustion product newly production amount XPout is calculated on the basis of the product of the metal component concentration Cm and the injection hole outlet temperature Tout. That is, the outlet combustion product newly production amount XPout is calculated using the metal component concentration Cm and the injection hole outlet temperature Tout as variables. Then, the outlet combustion product newly production amount XPout calculated by the formula 2 becomes large as the metal component concentration becomes high or the injection hole outlet temperature becomes high. That is, the matter that the outlet combustion product newly production amount becomes large as the metal component concentration becomes high or the injection hole outlet temperature becomes high is considered for the calculation of the outlet combustion produce newly production amount by the formula 2. Therefore, the combustion product production amount estimation of this embodiment has an advantage that the exact outlet combustion product newly production amount can be calculated.

Next, an embodiment of the deposit remove amount estimation of this invention will be explained. In one embodiment of the deposit remove amount estimation of this invention, a coefficient KRin indicating the easiness of the remove of the inlet deposit from the injection hole inlet area during a predetermined period (i.e. a predefined period) is calculated according to the following formula 3 (hereinafter, this coefficient will be referred to as—inlet deposit remove easiness coefficient—) and a coefficient KRout indicating the easiness of the remove of the outlet deposit from the injection hole outlet area during the predetermined period is calculated according to the following formula 4 (hereinafter, this coefficient will be referred to as—outlet deposit remove easiness coefficient—). It should be noted that the predetermined period is not limited to a particular period and may be set optionally, for example is a period between the continuous two fuel injections by the particular fuel injector.

$$KRin=FKRin(TXDin) \tag{3}$$

$$KRout=FKRout(TXDout) \tag{4}$$

In the formula 3, "TXDin" is the inlet deposit accumulation amount calculated by the last deposit accumulation amount estimation. In the formula 3, "FKRin" is a function adapted to calculate an appropriate inlet deposit remove easiness coefficient by the application of the inlet deposit accumulation amount. In the formula 4, "TXDout" is the outlet deposit accumulation amount calculated by the last deposit accumulation amount estimation. In the formula 4, "FKRout" is a function adapted to calculate an appropriate outlet deposit remove easiness coefficient by the application of the outlet deposit accumulation amount.

Further, in the deposit remove amount estimation of this embodiment, an amount XRin of the deposit removed from the injection hole inlet area during the predetermined period is calculated according to the formula 5 (hereinafter, this amount will be referred to as—inlet deposit newly remove amount—) and an amount XRout of the deposit removed from the injection hole outlet area during the predetermined period is calculated according to the formula 6 (hereinafter, this amount will be referred to as—outlet deposit newly remove amount—).

$$XRin=P \times KRin \tag{5}$$

$$XRout=P \times KRout \tag{6}$$

In the formulas 5 and 6, "P" is the fuel injection pressure at a particular timing during the predetermined period (hereinafter, this pressure will be simply referred to as—fuel injection pressure—). This fuel injection pressure is obtained, for example, from the output value of the pressure sensor 26 at the particular timing during the predetermined period. Of course, in place of the fuel injection pressure at the particular timing of the predetermined period, the average fuel injection pressure during the predetermined period can be used. Further, in the formula 5, "KRin" is the inlet deposit remove easiness coefficient calculated according to the formula 3 and in the formula 6, "KRout" is the outlet deposit remove easiness coefficient calculated according to the formula 4.

Next, the advantage of the deposit remove amount estimation of this embodiment will be explained. If all combustion product produced in turn as explained above accumulates on the wall face and the combustion product accumulating on the wall face (i.e. the deposit) is not removed from the wall face, the exact deposit accumulation amount can be obtained from the integration of the amount of the combustion product produced in turn. However, actually, while the combustion product is produced in turn and this combustion product accumulates on the wall face, the deposit may remove from the wall face. Therefore, in order to obtain the exact inlet and outlet deposit remove amounts, it is necessary to consider the amount of the combustion product produced in turn at the injection hole inlet and outlet areas as well as the amount of the deposit removing from the injection hole inlet area (i.e. the inlet deposit newly remove amount) and the amount of the deposit removing from the injection hole inlet area (i.e. the outlet deposit newly remove amount) for the calculation.

The inlet deposit newly remove amount differs depending on the fuel injection pressure and the inlet deposit remove easiness (i.e. the easiness of the remove of the inlet deposit from the injection hole inlet area). Concretely, when the inlet deposit remove easiness is constant, the inlet deposit newly remove amount becomes large as the fuel injection pressure becomes high. Further, when the fuel injection pressure is constant, the inlet deposit newly remove amount becomes large as the inlet deposit remove easiness becomes high. Therefore, in order to calculate the exact inlet deposit newly remove amount, the fuel injection pressure and the inlet deposit remove easiness should be considered for the calculation. For the same reason, in order to calculate the exact outlet deposit newly remove amount, the fuel injection pressure and the outlet deposit remove easiness should be considered for the calculation.

In this regard, in the deposit remove amount estimation of this embodiment, as shown in the formula 5, the inlet deposit newly remove amount XRin is calculated by multiplying the fuel injection pressure P by the inlet deposit remove easiness coefficient KRin. That is, the inlet deposit newly remove amount XRin is calculated using the fuel injection pressure P and the inlet deposit remove easiness coefficient KRin as variables. Then, the inlet deposit newly remove amount XRin calculated according to the formula 5 becomes large as the fuel injection pressure P becomes high and the inlet deposit remove easiness coefficient KRin becomes large. That is, the matter that the inlet deposit remove amount becomes large as the fuel injection pressure becomes high or the inlet deposit remove easiness becomes high is considered for the calculation of the inlet deposit remove amount according to the formula 5. Therefore, the deposit remove amount estimation of this embodiment has an advantage that the exact inlet deposit remove amount can be calculated.

Further, in the deposit remove amount estimation of this embodiment, as shown in the formula 6, the outlet deposit newly remove amount XRout is calculated by multiplying the fuel injection pressure P by the outlet deposit remove easiness coefficient KRout. That is, the outlet deposit newly remove amount XRout is calculated using the fuel injection pressure P and the outlet deposit remove easiness coefficient KRout as variables. Then, the outlet deposit newly remove amount XRout calculated according to the formula 6 becomes large as the fuel injection P becomes high and the outlet deposit remove easiness coefficient KRout becomes large. That is, the matter that the outlet deposit remove amount becomes large as the fuel injection pressure becomes high or the outlet deposit remove easiness becomes high is considered for the calculation of the outlet deposit remove amount according to the formula 6. Therefore, the deposit remove amount estimation of this embodiment has an advantage that the exact outlet deposit remove amount can be calculated.

The deposit accumulating on the area remote from the wall face is subject to a large pressure from the fuel flowing in the fuel injection hole, compared with the deposit accumulating on the area near the wall face. Then, this pressure becomes a force for removing the deposit from the wall face (hereinafter, this force will be referred to as—remove force). In this regard, if the deposit accumulates evenly on the injection hole inlet wall face, the thickness of the deposit from the injection hole inlet wall face becomes large as the inlet deposit accumulation amount (i.e. the amount of the deposit accumulating on the injection hole inlet area) becomes large. Therefore, as the inlet deposit accumulation amount becomes large, the amount of the deposit accumulating on the area remote from the injection hole inlet wall face becomes large and therefore, the remove force applied to the inlet deposit becomes large. Thus, even when the fuel injection pressure is constant, the inlet deposit remove amount becomes large as the inlet deposit accumulation amount becomes large. Therefore, in order to calculate the exact inlet deposit remove amount, a coefficient which does not have a constant value independently of the inlet deposit accumulation amount and varies depending on the inlet deposit accumulation amount should be employed as an inlet deposit remove coefficient used for the calculation. For the same reason, in order to calculate the exact outlet deposit remove amount, a coefficient which varies depending on the outlet deposit accumulation amount should be employed as an outlet deposit remove coefficient used for the calculation.

In this regard, in the deposit remove amount estimation of this embodiment, as shown in the formula 3, the inlet deposit remove easiness coefficient KRin is calculated by the function using the inlet deposit accumulation amount TXDin as a variable. That is, the inlet deposit accumulation amount is considered for the calculation of the inlet deposit remove easiness coefficient according to the formula 3. Therefore, the deposit remove amount estimation of this embodiment has an advantage that the exact inlet deposit remove easiness coefficient can be calculated and therefore, the exact inlet deposit remove amount can be calculated.

It should be obviously noted that the function FKRin for calculating the inlet deposit remove easiness coefficient is a function such that the calculated inlet deposit remove easiness coefficient KRin becomes large as the inlet deposit accumulation amount TXDin becomes large.

Further, in the deposit remove amount estimation of this embodiment, as shown in the formula 4, the outlet deposit remove easiness coefficient KRout is calculated by the function using the outlet deposit accumulation amount TXDout as a variable. That is, the outlet deposit accumulation amount is considered for the calculation of the outlet deposit remove easiness coefficient according to the formula 4. Therefore, the deposit remove amount estimation of this embodiment has an advantage that the exact outlet deposit remove easiness coefficient can be calculated and therefore, the exact outlet deposit remove amount can be calculated.

It should be obviously noted that the function FKRout for calculating the outlet deposit remove easiness coefficient is a function such that the calculated outlet deposit remove easiness coefficient KRout becomes large as the outlet deposit accumulation amount TXDout becomes large.

It should be noted that in the deposit remove amount estimation of the above-explained embodiment, it is assumed that the deposit accumulates evenly on the injection hole inlet wall face and the thickness of the inlet deposit (i.e. the thickness of the deposit from the injection hole inlet wall face) is constant at any area. However, if the deposit does not accumulate evenly on the injection hole inlet wall face, the inlet deposit remove easiness coefficient for calculating the exact inlet deposit remove amount can be calculated by using a function obtained by analyzing the data relating to the inlet deposit accumulation and remove amounts assuming that the deposit does not accumulate evenly on the injection hole inlet wall face as a function used for calculating the inlet deposit remove easiness coefficient.

Similarly, if the deposit does not accumulate evenly on the injection hole outlet wall face, the outlet deposit remove easiness coefficient for calculating the exact outlet deposit remove amount can be calculated by using a function obtained by analyzing the data relating to the outlet deposit accumulation and remove amounts assuming that the deposit does not accumulate evenly on the injection hole outlet wall face as a function used for calculating the outlet deposit remove easiness coefficient.

Next, a further advantage of the calculation of the amount of the deposit removing from the wall face by separately calculating the inlet and outlet deposit remove amounts will be explained. The deposit derived from the component such as a carbonate or an oxalate accumulates easily on the injection hole inlet area. The carbonate and the oxalate is easily removed from the injection hole inlet area by the fuel flowing into the fuel injection hole and flowing through the interior thereof. On the other hand, the deposit derived from the component such as a lower carboxylate accumulates easily on the injection hole outlet area. The lower carboxylate is difficultly removed from the injection hole outlet area by the fuel flowing through the interior of the fuel injection hole and injected therefrom. That is, even if the fuel injection pressure is constant and the deposit thickness (i.e. the thickness of the deposit from the wall face) is constant, the inlet deposit removes easily, compared with the outlet deposit. Therefore, in order to grasp the exact deposit remove amount, it is preferred that the inlet and outlet remove amounts are separately grasped.

The deposit remove amount estimation of this embodiment has an advantage that the further exact deposit remove amount can be calculated due to the separate calculation of the inlet and outlet deposit remove amounts.

Next, an embodiment of the deposit accumulation amount estimation of this invention will be explained. In one embodiment of the deposit accumulation amount estimation of this invention, the inlet deposit newly accumulation amount XDin during the predetermined period (i.e. the amount of the inlet deposit newly accumulating on the injection hole inlet area during the predetermined period) is calculated according to the following formula 7 and the outlet deposit newly accumulation amount XDout during the predetermined period (i.e. the amount of the outlet deposit newly accumulating on the injection hole outlet area during the predetermined period) is calculated according to the following formula 8.

$$XDin = XPin - XRin \quad (7)$$

$$XDout = XPout - XRout \quad (8)$$

In the formula 7, "XPin" is the inlet combustion product newly production amount calculated according to the formula 1 and "XRin" is the inlet deposit newly remove amount calculated according to the formula 3. In the formula 8, "XPout" is the outlet combustion product newly production amount calculated according to the formula 2 and "XRout" is the outlet deposit newly remove amount calculated according to the formula 4.

Then, in the deposit accumulation amount estimation of this embodiment, the inlet deposit accumulation amount TXDin is calculated according to the following formula 9 and the outlet deposit accumulation amount TXDout is calculated according to the following formula 10.

$$TXDin = TXDin + XDin \quad (9)$$

$$TXDout = TXDout + XDout \quad (10)$$

"TXDin" of the left-hand side of the formula 9 is the inlet deposit accumulation amount calculated by this time deposit accumulation amount estimation and "TXDin" of the right-hand side of the formula 9 is the inlet deposit accumulation amount calculated by the last time deposit accumulation amount estimation. "TXDout" of the left-hand side of the formula 10 is the outlet deposit accumulation amount calculated by this time deposit accumulation amount estimation and "TXDout" of the right-hand side of the formula 10 is the outlet deposit accumulation amount calculated by the last time deposit accumulation amount estimation.

Figure 7:
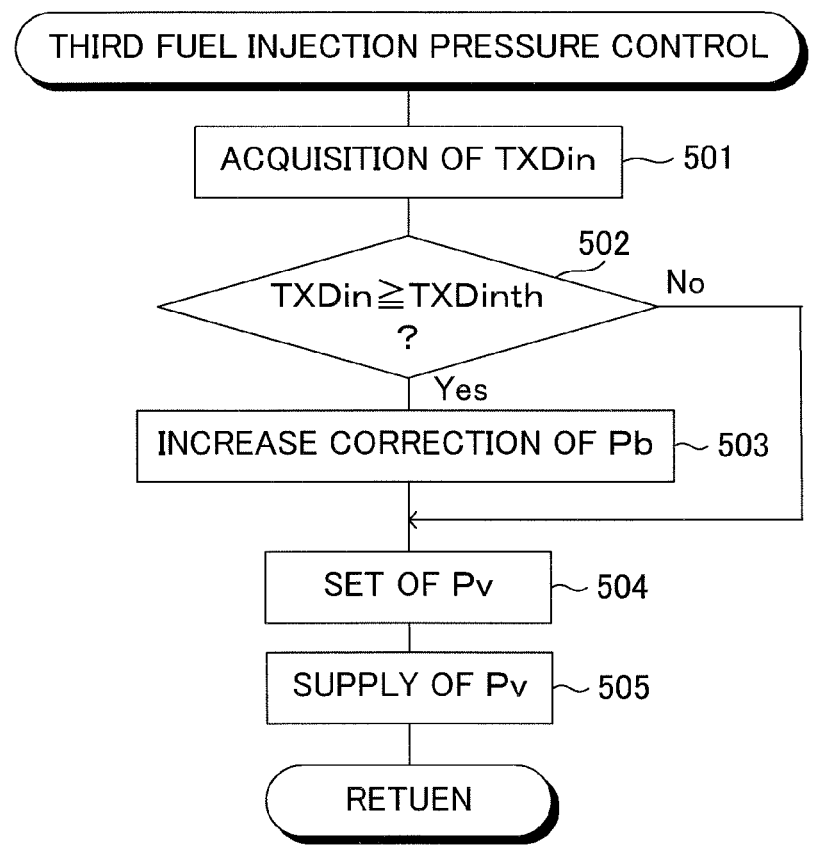
FIG. 7 is a view showing an example of a routine for performing a third fuel injection pressure control according to the invention.
Figure 9:
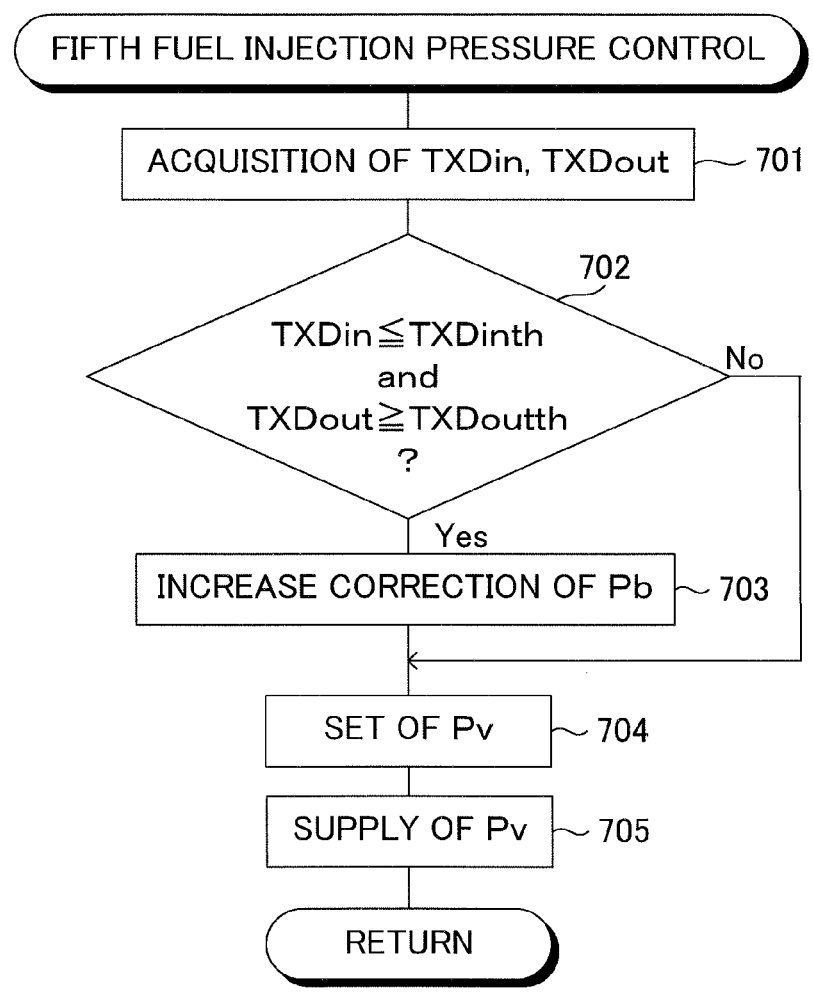
FIG. 9 is a view showing an example of a routine for performing a fifth fuel injection pressure control according to the invention.

Next, an advantage of the deposit accumulation amount estimation of this embodiment will be explained. The inlet deposit newly accumulation amount can be obtained by subtracting the inlet deposit newly remove amount during the predetermined period from the inlet combustion product newly production amount during the predetermined period. In this regard, in the deposit accumulation amount estimation of this embodiment, as shown in FIG. 7, the inlet deposit newly accumulation amount is calculated by subtracting the inlet deposit newly remove amount during the predetermined period from the inlet combustion product newly production amount during the predetermined period and the inlet combustion product newly production amount and the inlet deposit newly remove amount are the values calculated as the exact amounts, respectively, and therefore, the exact inlet deposit newly accumulation amount is calculated. Then, the inlet deposit accumulation amount is obtained by integrating the inlet deposit newly accumulation amounts. In this regard, in the deposit accumulation amount estimation of this embodiment, as shown in FIG. 9, the current inlet deposit accumulation amount is calculated by adding the inlet deposit newly accumulation amount XDin calculated according to the formula 7 to the already calculated inlet accumulation amount TXDin. Therefore, the deposit accumulation amount estimation of this embodiment has an advantage that the exact inlet deposit accumulation amount can be calculated.

Similarly, the outlet deposit newly accumulation amount can be obtained by subtracting the outlet newly remove amount during the predetermined period from the outlet combustion product newly production amount during the predetermined period. In this regard, in the deposit accumulation amount estimation of this embodiment, as shown in the formula 10, the outlet deposit newly accumulation amount is calculated by subtracting the outlet deposit newly remove amount during the predetermined period from the outlet combustion product newly production amount during the predetermined period and the outlet combustion product newly production amount and the outlet deposit newly remove amount are the values calculated as the exact amounts, respectively and therefore, the exact outlet deposit newly accumulation amount is calculated. Then, the outlet deposit accumulation amount can be obtained by integrating the outlet deposit newly accumulation amounts. In this regard, in the deposit accumulation amount estimation of this embodiment, as shown in the formula 10, the current outlet deposit accumulation amount is calculated by adding the outlet deposit newly accumulation amount XDout calculated according to the formula 8 to the already calculated outlet deposit accumulation amount TXDout. Therefore, the deposit accumulation amount estimation of this embodiment has an advantage that the exact outlet deposit accumulation amount can be calculated.

Figure 3:
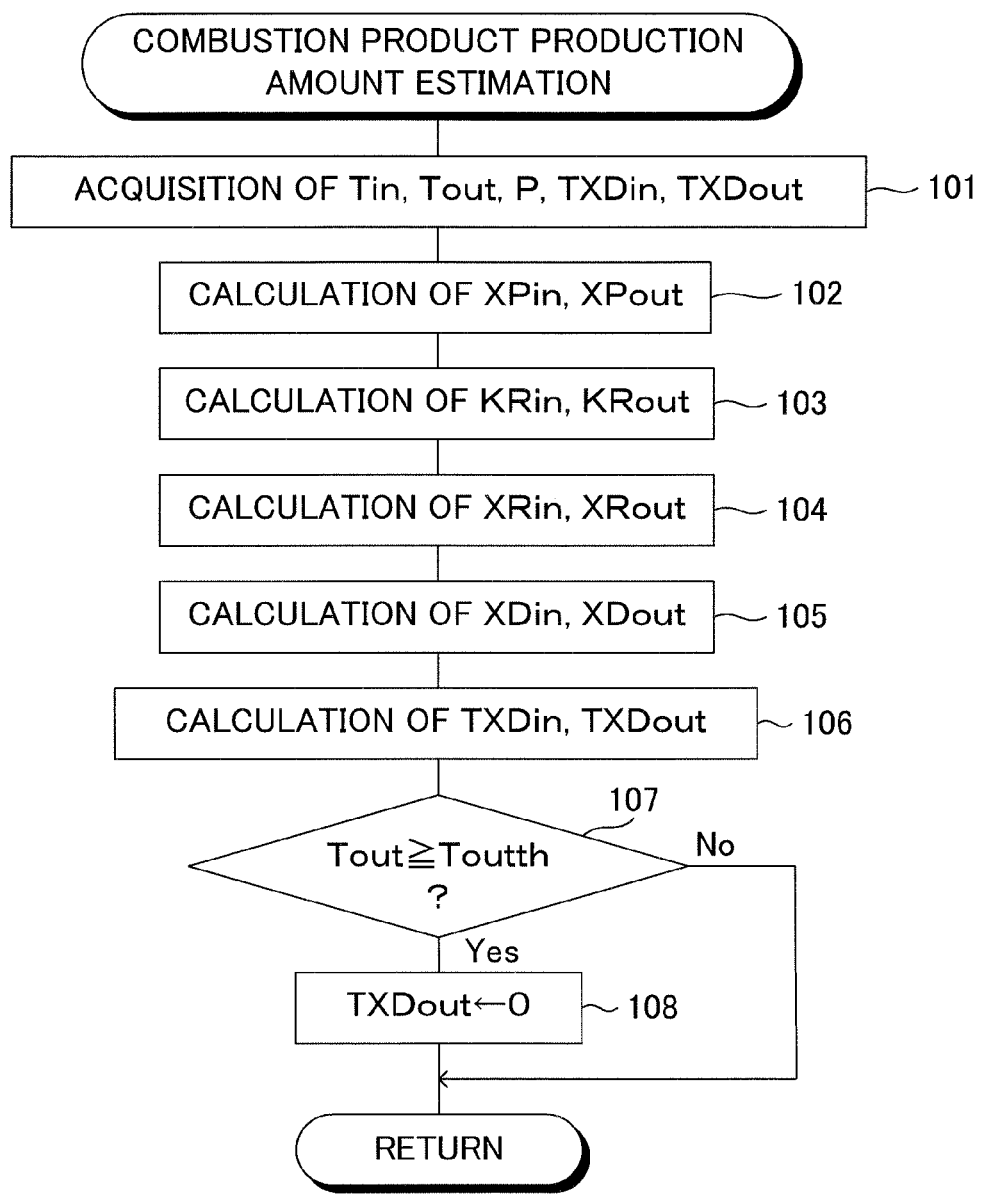
FIG. 3 is a view showing an example of a routine for performing a deposit accumulation amount estimation according to the invention.

Next, a routine for performing the deposit accumulation amount estimation of the above-explained embodiment will be explained. An example of this routine is shown in FIG. 3. The routine shown in FIG. 3 is performed every time a predetermined time has elapsed.

When the routine shown in FIG. 3 starts, first, at the step 101, the injection inlet and outlet temperatures Tin and Tout, fuel injection pressure P and the inlet and outlet deposit accumulation amounts TXDin and TXDout calculated by the last time performance of this routine are acquired. Next, at the step 102, the inlet combustion product newly production amount XPin is calculated by applying the injection hole inlet temperature Tin acquired at the step 101 to the formula 1 and the outlet combustion product newly production amount XPout is calculated by applying the injection hole outlet temperature Tout acquired at the step 101 to the formula 2. Next, at the step 103, the inlet deposit remove easiness coefficient KRin is calculated by applying the inlet deposit accumulation amount TXDin acquired at the step 101 to the formula 3 and the outlet deposit remove easiness coefficient KRout is calculated by applying the outlet deposit accumulation amount TXDout acquired at the step 101 to the formula 4.

Next, at the step 104, the inlet deposit newly remove amount XRin is calculated by applying the fuel injection pressure P acquired at the step 101 and the inlet deposit remove easiness coefficient KRin calculated at the step 103 to the formula 5 and the outlet deposit newly remove amount XRout is calculated by applying the fuel injection pressure P acquired at the step 101 and the outlet deposit remove easiness coefficient KRout calculated at the step 103 to the formula 6. Next, at the step 105, the inlet deposit newly accumulation amount XDin is calculated by applying the inlet combustion product newly production amount XPin calculated at the step 102 and the inlet deposit newly remove amount XRin calculated at the step 104 to the formula 7 and the outlet deposit newly accumulation amount XDout is calculated by applying the outlet combustion product newly production amount XPout calculated at the step 102 and the outlet deposit newly remove amount XRout calculated at the step 104 to the formula 8. Next, at the step 106, the inlet deposit accumulation amount TXDin is calculated by applying the inlet deposit newly accumulation amount XDin calculated at the step 105 to the formula 9 and the outlet deposit accumulation amount TXDout is calculated by applying the outlet deposit newly accumulation amount XDout calculated at the step 105 to the formula 10.

Next, at the step 107, it is judged if the injection hole outlet temperature Tout acquired at the step 101 is equal to or higher than a predetermined injection hole outlet temperature Toutth (Tout≥Toutth). When it is judged that Tout≥Toutth, the routine proceeds to the step 108. On the other hand, when it is judged that Tout<Toutth, the routine is directly terminated. In this case, the inlet deposit accumulation amount calculated by this time performance of this routine is the amount TXDin calculated at the step 106 and the outlet deposit accumulation amount calculated by this time performance of this routine is the amount TXDout calculated at the step 106.

When it is judged that Tout≥Toutth at the step 107 and then, the routine proceeds to the step 108, the outlet deposit accumulation amount TXDout calculated at the step 106 is set as zero and then, the routine is terminated. In this case, the inlet deposit accumulation amount calculated by this time performance of this routine is the amount TXDin calculated at the step 106 and the outlet deposit accumulation amount calculated by this time performance of this routine is zero.

The carbonate among the components constituting the deposit (i.e. the lower carboxylate, the carbonate and the oxalate) decomposes when the surrounding temperature is equal to or larger than a certain temperature. Further, in the above-explained embodiment, the part on which the carbonate accumulates as the deposit is the injection hole inlet area. Thus, in the above-explained embodiment, when the injection hole inlet temperature becomes equal to or larger than a predetermined temperature (i.e. the decompose temperature of the carbonate constituting the deposit), the accumulation amount of the deposit derived from the component such as the carbonate among the inlet deposit accumulation amount is set as zero and then, the inlet deposit accumulation amount may be newly calculated. It should be noted that the above-mentioned predetermined temperature is obtained by the experiment, etc. as the temperature at which the carbonate decomposes and may be any temperature which is a predetermined temperature, for example, in general, 300 degrees centigrade.

Of course, this matter may be similarly applied to the lower carboxylate and the oxalate. That is, if the temperature at which the lower carboxylate constituting the deposit decomposes is previously known, the part on which the lower carboxylate accumulates as the deposit in the above-explained embodiment is the injection hole outlet area and therefore, when the injection hole outlet temperature becomes equal to or larger than a predetermined temperature (i.e. the decompose temperature of the lower carboxylate constituting the deposit), the accumulation amount of the deposit derived from the component such as the lower carboxylate among the outlet deposit accumulation amount is set as zero and then, the outlet deposit accumulation amount may be newly calculated. Further, if the temperature at which the oxalate constituting the deposit decomposes is previously known, the part on which the oxalate accumulates as the deposit is the injection hole inlet area and therefore, when the injection hole inlet temperature becomes equal to or larger than a predetermined temperature (i.e. the decompose temperature of the oxalate constituting the deposit), the accumulation amount of the deposit derived from the component such as the oxalate amount the inlet deposit accumulation amount is set as zero and then, the inlet deposit accumulation amount may be newly calculated.

The above-explained embodiment is one assuming that the deposit derived from the components such as the carbonate and the oxalate accumulates on the injection hole inlet area and the deposit derived from the component such as the lower carboxylate accumulates on the injection hole outlet area. However, the components of the deposit accumulating on the areas is not limited to the above-mentioned components and differ depending on the property of the fuel, the shape of the fuel injection hole, the condition of the surrounding environment of the fuel injection hole, etc. Therefore, even if the components of the deposit accumulating on the areas are different from those of the above-explained embodiment, the exact combustion product production amount, the exact deposit remove amount and the exact deposit accumulation amount at each area can be estimated by using the technical concept of this invention explained relating to the above-explained embodiments in consideration of the property of the fuel, the shape of the fuel injection hole, the condition of the surrounding environment of the fuel injection hole, etc.

Next, one embodiment of the fuel injection control of this invention will be explained. The fuel injection control of this embodiment is a control for controlling the fuel injection amount and includes a control for compensating a fuel injection amount error due to the inlet deposit (i.e. this error is the difference of the actual fuel injection amount relative to a planned fuel injection amount in the case that the actual fuel injection amount when the inlet deposit is zero is referred to as—planned fuel injection amount—and hereinafter, this error will be simply referred to as—fuel injection amount error—). Below, this fuel injection control will be referred to as—fuel injection amount control—. In this fuel injection amount control, fuel injection amounts for outputting required torques from the engine when the inlet deposit accumulation amount is zero are previously obtained as base fuel injection amounts depending on the required torques. Further, the smallest amount (this may be zero) among the inlet deposit accumulation amount generating the fuel injection amount error necessary to be compensated is previously obtained as a predetermined inlet deposit accumulation amount. Further, the smallest amount among the fuel injection amount making the fuel injection amount error the positive value (i.e. the fuel injection amount making the actual fuel injection amount smaller than the target fuel injection amount) is previously obtained as a predetermined fuel injection amount.

Then, during the engine operation (i.e. during the operation of the engine), a base fuel injection amount depending on the required torque is set. Then, when the inlet deposit accumulation amount is smaller than the predetermined inlet deposit accumulation amount, the base fuel injection amount is set directly as a target fuel injection amount independently of whether the base fuel injection amount is equal to or larger than the predetermined fuel injection amount and then, a fuel injection command value corresponding to this target fuel injection amount is supplied to the fuel injector. On the other hand, when the inlet deposit accumulation amount is equal to or larger than the predetermined inlet deposit accumulation amount, it is judged if the base fuel injection amount is equal to or larger than the predetermined fuel injection amount. When it is judged that the base fuel injection amount is equal to or larger than the predetermined fuel injection amount, the fuel injection amount obtained by increasing the base fuel injection amount by a predetermined amount is set as a target fuel injection amount and then, a fuel injection command value corresponding to this target fuel injection amount is supplied to the fuel injector. On the other hand, when it is judged that the base fuel injection amount is smaller than the predetermined fuel injection amount, the fuel injection amount obtained by decreasing the base fuel injection amount by a predetermined amount is set as a target fuel injection amount and then, a fuel injection command value corresponding to this target fuel injection amount is supplied to the fuel injector.

Next, the advantage of the fuel injection amount control of this embodiment will be explained. Even if the base fuel injection amount is set as a target fuel injection amount when the combustion product has accumulated on the injection hole inlet area as the inlet deposit and then, a fuel injection command value corresponding to this target fuel injection amount is supplied to the fuel injector, the fuel having the base fuel injection amount is not injected from the fuel injector due to the inlet deposit. That is, the actual fuel injection amount is different from the base fuel injection amount. Further, this difference amount (i.e. the fuel injection amount error) varies depending on the inlet deposit accumulation amount. Therefore, if the base fuel injection amount corrected such that the fuel injection amount error becomes zero depending on the inlet deposit accumulation amount is set as a target fuel injection amount and then, a fuel injection command value corresponding to this target fuel injection amount is supplied to the fuel injector, even when the combustion product has accumulated on the injection hole inlet area, the fuel having the base fuel injection amount is injected from the fuel injector. Therefore, the fuel injection amount control of this embodiment has an advantage that the fuel having the base fuel injection amount can be injected from the fuel injector and therefore, the required torque can be output from the engine. Further, there is an advantage that if the fuel injection amount control of this embodiment is applied to the case that the air-fuel ratio is controlled to a particular air-fuel ratio in order to maintain the particular property of the engine (for example, the property of the exhaust gas emission) high, the fuel having the base fuel injection amount can be injected from the fuel injector and therefore, the air-fuel ratio can be controlled to the particular air-fuel ratio and therefore, the particular property of the engine can be maintained high.

Further, in the fuel injection amount control of this embodiment, in the case that the inlet deposit accumulation amount is equal to or larger than the predetermined inlet deposit accumulation amount, the base fuel injection amount is increased when the base fuel injection amount is equal to or larger than the predetermined fuel injection amount while the base fuel injection amount is decreased when the base fuel injection amount is smaller than the predetermined fuel injection amount. The reason why the correction is changed between the corrections for increasing and decreasing the base fuel injection amount depending on the base fuel injection amount as explained above is the following.

That is, if the combustion product has accumulated on the injection hole inlet area as the deposit when the fuel injection command value corresponding to the base fuel injection amount is supplied to the fuel injector, it is generally realized that the actual fuel injection amount is smaller than the base fuel injection amount and further, the actual fuel injection amount becomes smaller than the base fuel injection amount as the inlet deposit accumulation amount becomes large. Indeed, in the case that the fuel injection amount (i.e. the amount of the fuel injected from the fuel injector) is relatively large, if the combustion product has accumulated on the injection hole inlet area as the deposit, the actual fuel injection amount is smaller than the base fuel injection amount. However, in the base that the fuel injection amount is relatively small (in particular, the fuel injection amount is a minute amount), if the combustion product has accumulated on the injection hole inlet area as the deposit, the actual fuel injection amount is not smaller but larger than the base fuel injection amount.

That is, if the combustion product has accumulated on the injection hole inlet area as the deposit, the fuel difficultly flows through the fuel injection hole. Thus, independently of whether the fuel injection amount is large or small, if the combustion product has accumulated on the injection hole inlet area as the deposit, the amount of the fuel which can pass through the fuel injection hole is small. However, the pressure of the fuel in the suck of the fuel injector increases by the decrease of the amount of the fuel which can pass through the fuel injection hole. Then, the opening speed of the needle of the fuel injector (i.e. the speed of the movement of the needle such that the outer wall face of the tapered tip end portion of the needle moves away from the inner peripheral wall face of the tip end portion of the nozzle) increases by the increase of the pressure of the fuel in the suck. Thus, the fuel injection period (i.e. this is a period that the fuel is being injected from the fuel injection hole and corresponds to a period that the outer wall face of the tapered tip end portion of the needle is away from the inner peripheral wall face of the tip end portion of the nozzle) is at least elongated. On the other hand, in the case that the fuel injection amount is relatively large, the fuel injection period is relatively long and therefore, the decrease of the amount of the fuel passing through the fuel injection hole due to the increase of the pressure of the fuel in the suck is dominant relative to the fuel injection amount, compared with the elongation of the fuel injection period by the increase of the pressure of the fuel in the suck. As a result, if the combustion product has accumulated on the injection hole inlet area as the deposit in the case that the fuel injection amount is relatively large, it is estimated that the actual fuel injection amount is smaller than the base fuel injection amount. On the other hand, in the case that the fuel injection amount is relatively small, the fuel injection period is relatively short and therefore, the elongation of the fuel injection period by the increase of the pressure of the fuel in the suck is dominant relative to the fuel injection amount, compared with the decrease of the amount of the fuel passing through the fuel injection hole. As a result, if the combustion product has accumulated on the injection hole inlet area as the deposit in the case that the fuel injection amount is relatively small, it is estimated that the actual fuel injection amount is larger than the base fuel injection amount.

From the above-explained reasons, in the fuel injection amount control of this embodiment, the correction is changed between the corrections for increasing and decreasing the base fuel injection amount depending on the base fuel injection amount.

It should be noted that in consideration of the above-explained matter, the predetermined amount for increasing the base fuel injection amount (hereinafter, this predetermined amount will be referred to as—predetermined increment—) is set as a value for increasing the fuel injection amount to an amount for compensating the fuel injection amount error.

Further, in place of using the predetermined increment, a predetermined increase rate for increasing the base fuel injection amount by a predetermined rate may be used. Then, the predetermined increment or increase rate may be a constant amount or rate independently of the inlet deposit accumulation amount and the base fuel injection amount or may be an amount or a rate set in consideration of the inlet deposit accumulation amount or the base fuel injection amount. In this regard, in the case that the predetermined increment or increase rate is set in consideration of the inlet deposit accumulation amount, the predetermined increment or increase rate is set as a large value as the inlet deposit accumulation amount becomes large. Further, in the case that the predetermined increment or increase rate is set in consideration of the base fuel injection amount, the predetermined increment or increase rate is, for example, set as a large value as the base fuel injection amount becomes large.

Further, the predetermined amount for decreasing the base fuel injection amount (hereinafter, this predetermined amount will be referred to as—predetermined decrement—) is set as a value for decreasing the fuel injection amount to an amount for compensating the fuel injection amount error.

Further, in place of using the predetermined decrement, a predetermined decrease rate for decreasing the base fuel injection amount by a predetermined rate may be used. Then, the predetermined decrement or decrease rate may be a constant amount or rate independently of the inlet deposit accumulation amount and the base fuel injection amount or may be an amount or a rate set in consideration of the inlet deposit accumulation amount or the base fuel injection amount. In this regard, in the case that the predetermined decrement or decrease rate is set in consideration of the inlet deposit accumulation amount, the predetermined decrement or decrease rate is set as a large value as the inlet deposit accumulation amount becomes large. Further, in the case that the predetermined decrement or decrease rate is set in consideration of the base fuel injection amount, the predetermined decrement or decrease rate is, for example, set as a large value as the base fuel injection amount becomes large.

It should be noted that even if the fuel injection amount is not increased or decreased so as to make the fuel injection amount error zero, the actual fuel injection amount can be made to approach the base fuel injection amount by increasing or decreasing the fuel injection amount such that the fuel injection amount error decreases and this has an advantage. Therefore, in the fuel injection amount control of this embodiment, the predetermined increment or increase rate or decrement or decrease rate may be set as a value for increasing or decreasing the fuel injection amount such that the fuel injection amount error decreases.

Figure 4:
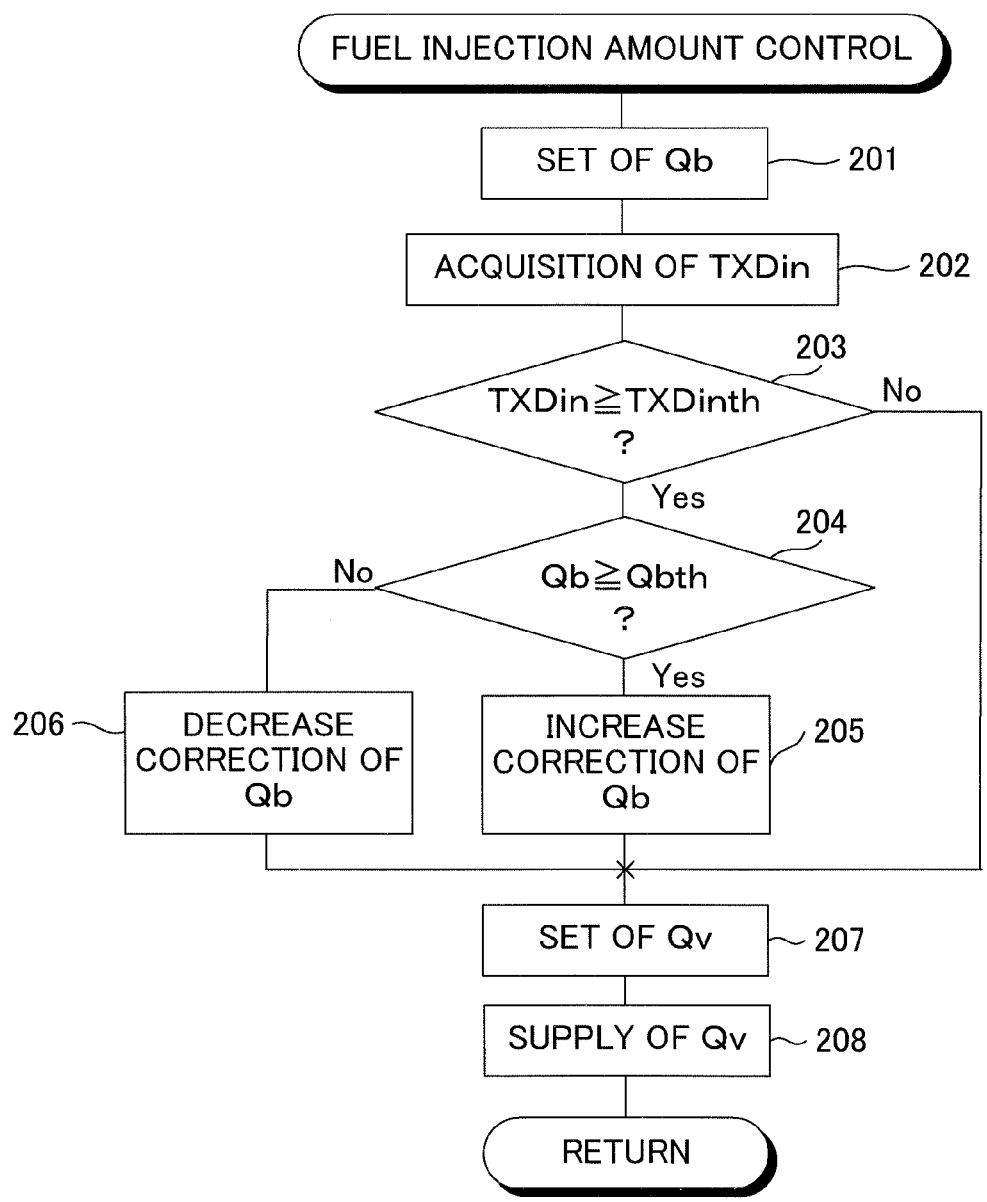
FIG. 4 is a view showing an example of a routine for performing a fuel injection amount control according to the invention.

Next, a routine for performing the fuel injection amount control of the above-explained embodiment will be explained. An example of this routine is shown in FIG. 4. The routine shown in FIG. 4 is performed every time a predetermined time has elapsed.

When the routine shown in FIG. 4 starts, first, at the step 201, a base fuel injection amount Qb is set. Next, at the step 202, an inlet deposit accumulation amount TXDin is acquired. Next, at the step 203, it is judged if the inlet deposit accumulation amount TXDin acquired at the step 202 is equal to or larger than a predetermined inlet deposit accumulation amount TXDinth (TXDin≥TXDinth). When it is judged that TXDin≥TXDinth, the routine proceeds to the step 204. On the other hand, when it is judged that TXDin≥TXDinth, the routine proceeds to the step 207.

When it is judged that TXDin≥TXDinth at the step 203 and the routine proceeds to the step 204, it is judged if the base fuel injection amount Qb acquired at the step 201 is equal to or larger than a predetermined fuel injection amount Qb (Qb≥Qbth). When it is judged that Qb≥Qbth, the routine proceeds to the step 205. On the other hand, when it is judged that Qb<Qbth, the routine proceeds to the step 206.

When it is judged that Qb≥Qbth at the step 204 and then, the routine proceeds to the step 205, a correction for increasing the base fuel injection amount Qb acquired at the step 201 by a predetermined amount is performed and then, the routine proceeds to the step 207. On the other hand, when it is judged that Qb<Qbth at the step 204 and then, the routine proceeds to the step 206, a correction for decreasing the base fuel injection amount Qb acquired at the step 201 by a predetermined amount is performed and then, the routine proceeds to the step 207.

In the case that the routine proceeds from the step 203 directly to the step 207, the base fuel injection amount Qb acquired at the step 201 is set directly as a target fuel injection amount and then, a fuel injection command value Qb corresponding to the target fuel injection amount is set. On the other hand, in the case that the routine proceeds from the step 205 to the step 207, the base fuel injection amount Qb increased at the step 205 is set as a target fuel injection amount and then, a fuel injection command value Qv corresponding to the target fuel injection amount is set. On the other hand, in the case that the routine proceeds from the step 206 to the step 207, the base fuel injection amount Qb decreased at the step 206 is set as a target fuel injection amount and then, a fuel injection command value Qv corresponding to the target fuel injection amount is set. Next, at the step 208, the fuel injection command value Qv set at the step 207 is supplied to the fuel injector and then, the routine is terminated.

Next, another embodiment of the fuel injection control of this invention will be explained. The fuel injection control of this embodiment is a control for controlling the fuel injection pressure and includes a control for compensating the decrease of the atomization degree of the injected fuel due to the outlet deposit. Below, this fuel injection control will be referred to as—first fuel injection pressure control—. In this first fuel injection pressure control, a pressure suitable as the fuel injection pressure when the inlet and outlet deposit accumulation amounts are zero is previously obtained as a base fuel injection pressure. Further, a smallest amount (this amount may be zero) among the outlet deposit accumulation amounts generating the decrease of the atomization degree of the injected fuel due to the outlet deposit necessary to be compensated (hereinafter, this decrease will be simply referred to as—the decrease of the atomization degree of the injected fuel) is previously obtained as a predetermined outlet deposit accumulation amount. Then, during the engine operation, when the outlet deposit accumulation amount is smaller than the predetermined outlet deposit accumulation amount, the base fuel injection pressure is set directly as a target fuel injection pressure and then, the fuel injection pressure is controlled to this target fuel injection pressure. On the other hand, when the outlet deposit accumulation amount is equal to or larger than the predetermined outlet deposit accumulation amount, the fuel injection pressure obtained by increasing the base fuel injection pressure by a predetermined value is set to a target fuel injection pressure and then, the fuel injection pressure is controlled to this target fuel injection pressure.

Next, the advantage of the first fuel injection pressure control will be explained. If the combustion product has accumulated on the injection hole outlet area as the deposit, the atomization degree of the injected fuel decreases. On the other hand, if the fuel injection pressure is increased, the atomization degree of the injected fuel becomes high. Therefore, if the fuel injection pressure is increased such that the atomization degree of the injected fuel becomes the predetermined atomization degree depending on the outlet deposit accumulation amount, even when the combustion product has accumulated on the injection hole outlet area, the atomization degree of the injected fuel becomes the predetermined atomization degree. In the first fuel injection pressure control, when the outlet deposit accumulation amount is relatively large and the decrease of the atomization degree of the injected fuel is relatively large, the fuel injection pressure is increased. Therefore, the first fuel injection pressure control has an advantage that the atomization degree of the injected fuel can be maintained to the predetermined atomization degree and therefore, the property of the exhaust gas emission of the engine can be maintained to the predetermined property.

It should be noted that in consideration of the above-explained matter, the predetermined value for increasing the base fuel injection pressure (hereinafter, this value will be referred to as—predetermined increment—) is set as a value for increasing the fuel injection pressure to a pressure for compensating the decrease of the atomization degree of the injected fuel.

Further, in place of using the predetermined increment, a predetermined increase rate for increasing the base fuel injection pressure by a predetermined rate may be used. Then, the predetermined increment or increase rate may be a constant value or rate independently of the outlet deposit accumulation amount or may be a value or rate set in consideration of the outlet deposit accumulation amount. In this regard, in the case that the predetermined increment or increase rate is set in consideration of the outlet deposit accumulation amount, the decrease of the atomization degree of the injected fuel generally tends to increase as the outlet deposit accumulation amount and therefore, the predetermined increment or increase rate may be set as a large value as the outlet deposit accumulation amount becomes large.

It should be noted that if the fuel injection pressure is not increased such that the decrease of the atomization degree of the injected fuel becomes zero, the increase of the fuel injection pressure has at least an advantage that the atomization degree of the injected fuel can be improved. Therefore, in the first fuel injection pressure control, the predetermined increment or increase rate may be set as a value for increasing the fuel injection pressure.

Figure 5:
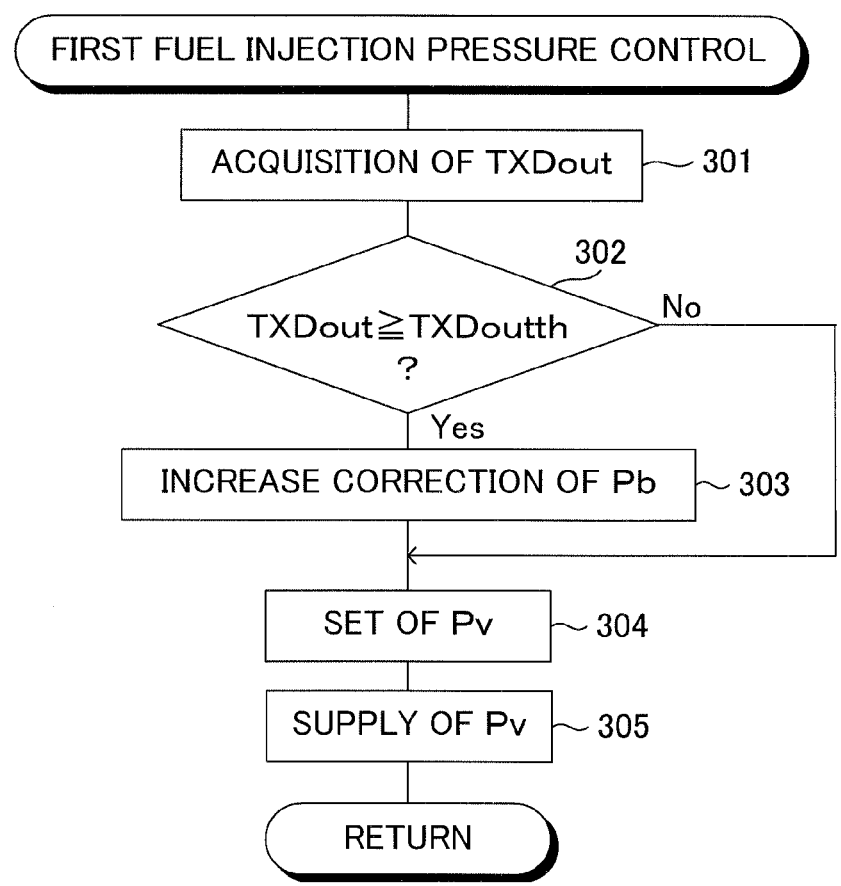
FIG. 5 is a view showing an example of a routine for performing a first fuel injection pressure control according to the invention.

Next, a routine for performing the first fuel injection pressure control of the above-explained embodiment will be explained. An example of this routine is shown in FIG. 5. The routine shown in FIG. 5 is performed every time a predetermined time has elapsed.

When the routine shown in FIG. 5 starts, first, at the step 301, an outlet deposit accumulation amount TXDout is acquired. Next, at the step 302, it is judged that the outlet deposit accumulation amount TXDout acquired at the step 301 is equal to or larger than a predetermined outlet deposit accumulation amount TXDoutth (TXDout≥TXDoutth). When it is judged that TXDout≥TXDoutth, the routine proceeds to the step 303. On the other hand, when it is judged that TXDout<TXDoutth, the routine proceeds directly to the step 304.

When it is judged that TXDout≥TXDoutth at the step 302 and then, the routine proceeds to the step 303, a correction for increasing the base fuel injection pressure by a predetermined value is performed and then, the routine proceeds to the step 304.

In the case that the routine proceeds from the step 302 directly to the step 304, the base fuel injection pressure Pb is set directly as a target fuel injection pressure and then, a pump command value Pv corresponding to the target fuel injection pressure is set. On the other hand, in the case that the routine proceeds from the step 303 to the step 304, the base fuel injection pressure Pb increased at the step 303 is set as a target fuel injection pressure and then, a pump command value corresponding to the target fuel injection pressure is set. Next, at the step 305, the pump command value Pv set at the step 304 is supplied to the fuel pump and then, the routine is terminated.

Next, a further embodiment of the fuel injection control of this invention will be explained. The fuel injection control of this embodiment is a control for controlling the fuel injection pressure and includes a control for removing the outlet deposit from the injection hole outlet area. Below, this fuel injection control will be referred to as—second fuel injection pressure control—. In this second fuel injection pressure control, a pressure suitable as the fuel injection pressure when the inlet and outlet deposit accumulation amounts are zero is previously obtained as a base fuel injection pressure. Further, a smallest amount (this amount may be zero) among the outlet deposit accumulation amounts generating a necessity to remove the outlet deposit is previously obtained as a predetermined outlet deposit accumulation amount. Then, during the engine operation, when the outlet deposit accumulation amount is smaller than the predetermined outlet deposit accumulation amount, the base fuel injection pressure is set directly as a target fuel injection pressure and then, the fuel injection pressure is controlled to this target fuel injection pressure. On the other hand, when the outlet deposit accumulation amount is equal to or larger than the predetermined outlet deposit accumulation amount, the fuel injection pressure obtained by increasing the base fuel injection pressure by a predetermined value is set as a target fuel injection pressure and then, the fuel injection pressure is controlled to this target fuel injection pressure.

Next, the advantage of the second fuel injection pressure control will be explained. If the combustion product has accumulated on the injection hole outlet area as the outlet deposit, the atomization degree of the injected fuel decreases. On the other hand, the outlet deposit is mainly constituted by the lower carboxylate and this lower carboxylate can be removed by the relatively small increase of the fuel injection pressure. Then, if the outlet deposit is removed from the injection hole outlet area, the atomization degree of the injected fuel is improved. Therefore, if it is judged that it is desired that the outlet deposit is positively removed from the injection hole outlet area, it is desired that the outlet deposit is removed from the injection hole outlet area by the increase of the fuel injection pressure. In the second fuel injection pressure control, when it is judged that the outlet deposit accumulation amount is relatively large and it is necessary to remove the outlet deposit, the outlet deposit is removed from the injection hole outlet area by the increase of the fuel injection pressure. Therefore, the second fuel injection pressure control has an advantage that the atomization degree of the injected fuel can be improved and therefore, the property of the exhaust gas emission of the engine can be improved.

It should be noted that in consideration of the above-explained matter, the predetermined value for increasing the base fuel injection pressure (hereinafter, this value will be referred to as—predetermined increment—) is set as a value for increasing the fuel injection pressure to a pressure for removing the outlet deposit.

Further, in place of using the predetermined increment, a predetermined increase rate for increasing the base fuel injection pressure by a predetermined rate may be used. Then, the predetermined increment or increase rate may be a constant value or rate independently of the outlet deposit accumulation amount or may be a value or rate set in consideration of the outlet deposit accumulation amount. In this regard, in the case that the predetermined increment or increase rate is set in consideration of the outlet deposit accumulation amount, the predetermined increment or increase rate may be set as follows.

That is, the deposit accumulating on the area remote from the wall face is subject to a large pressure from the fuel flowing in the fuel injection hole, compared with the deposit accumulating on the area near the wall face. Then, this pressure becomes a force for removing the deposit from the wall face (i.e. the remove force). In this regard, if the deposit has accumulated evenly on the injection hole outlet wall face, the thickness of the deposit from the injection hole outlet wall face is large as the outlet deposit accumulation amount becomes large. Therefore, as the outlet deposit accumulation amount becomes large, the amount of the deposit accumulating on the area remote from the injection hole outlet wall face is large and therefore, the remove force exerting on the outlet deposit is also large. Thus, if the fuel injection pressure is constant, the outlet deposit is easily removed as the outlet deposit accumulation amount becomes large. In other words, as the outlet deposit accumulation amount becomes large, the outlet deposit can be removed by the small increase of the fuel injection pressure. Therefore, in the case that the predetermined increment and increase rate is set in consideration of the outlet deposit accumulation amount, the predetermined increment or increase rate may be set as a small value as the outlet deposit accumulation amount becomes large.

Further, as the outlet deposit accumulation amount becomes large, the outlet deposit is easily removed and therefore, as the outlet deposit accumulation amount becomes small, the outlet deposit is difficultly removed. Therefore, in order to remove the outlet deposit when the outlet deposit accumulation amount is small, it is necessary to relatively largely increase the fuel injection pressure and even if the fuel injection pressure is relatively largely increased, there is a possibility that the outlet deposit cannot be removed. In this regard, the useless performance of the increase of the fuel injection pressure for removing the outlet deposit is avoided by setting an amount so as not to remove the outlet deposit if the fuel injection pressure is relatively largely increased as the predetermined outlet deposit accumulation amount of the second fuel injection pressure control.

It should be noted that the remove of the outlet deposit from the injection hole outlet area has an advantage that the atomization degree of the injected fuel is improved although the outlet deposit is not removed from the injection hole outlet area to the degree that the decrease of the atomization degree of the injected fuel becomes zero. Therefore, the predetermined increment or increase rate in the second fuel injection pressure control may be set as a value for removing the outlet deposit from the injection hole outlet area.

Figure 6:
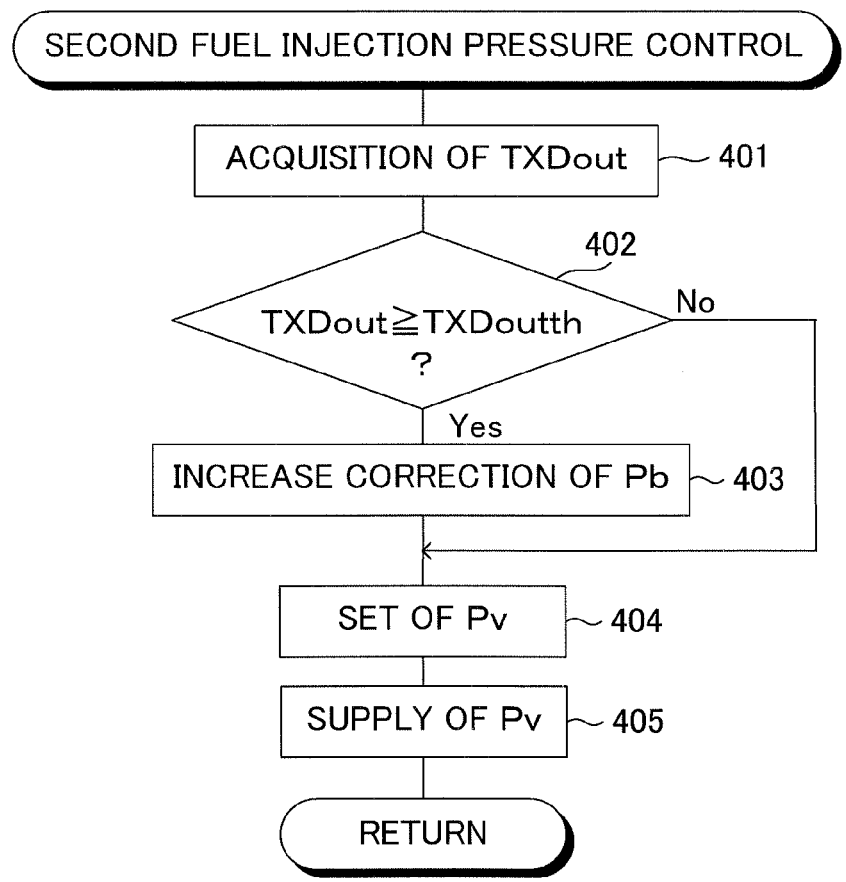
FIG. 6 is a view showing an example of a routine for performing a second fuel injection pressure control according to the invention.

Next, a routine for performing the second fuel injection pressure control of the above-explained embodiment will be explained. An example of this routine is shown in FIG. 6. The routine shown in FIG. 6 is performed every time a predetermined time has elapsed.

When the routine shown in FIG. 6 starts, first, at the step 401, an outlet deposit accumulation amount TXDout is acquired. Next, at the step 402, it is judged if the outlet deposit accumulation amount TXDout acquired at the step 401 is equal to or larger than a predetermined outlet deposit accumulation amount TXDout (TXDout≥TXDoutth). When it is judged that TXDout≥TXDoutth, the routine proceeds to the step 403. On the other hand, when it is judged that TXDout<TXDoutth, the routine proceeds directly to the step 404.

When it is judged that TXDout≥TXDoutth at the step 402 and then, the routine proceeds to the step 403, a correction for increasing the base fuel injection pressure Pb by a predetermined value is performed and then, the routine proceeds to the step 404.

In the case that the routine proceeds from the step 402 directly to the step 404, the base fuel injection pressure Pb is set directly as a target fuel injection pressure and then, a pump command value Pv corresponding to the target fuel injection pressure is set. On the other hand, in the case that the routine proceeds from the step 403 to the step 404, the base fuel injection pressure Pb increased at the step 403 is set as a target fuel injection pressure and then, a pump command value Pv corresponding to the target fuel injection pressure is set. Next, at the step 405, the pump command value Pv set at the step 404 is supplied to the fuel pump and then, the routine is terminated.

Next, a further embodiment of the fuel injection control of this invention will be explained. The fuel injection control of this embodiment is a control for controlling the fuel injection pressure and includes a control for removing the inlet deposit from the injection hole inlet area. Below, this fuel injection control will be referred to as—third fuel injection pressure control—. In this third fuel injection pressure control, a pressure suitable as the fuel injection pressure when the inlet and outlet deposit accumulation amounts are zero is previously obtained as a base fuel injection pressure. Further, a smallest amount (this amount may be zero) among the inlet deposit accumulation amounts generating the necessity of the remove of the inlet deposit is previously obtained as a predetermined inlet deposit accumulation amount. Then, when the inlet deposit accumulation amount is smaller than the predetermined inlet deposit accumulation amount during the engine operation, the base fuel injection pressure is set directly to the target fuel injection pressure and then, the fuel injection pressure is controlled to this target fuel injection pressure. On the other hand, when the inlet deposit accumulation amount is equal to or larger than the predetermined inlet deposit accumulation amount, the fuel injection pressure obtained by increasing the base fuel injection pressure by a predetermined value is set to a target fuel injection pressure and then, the fuel injection pressure is controlled to this target fuel injection pressure.

Next, the advantage of the third fuel injection pressure control will be explained. Even if the base fuel injection amount is set to a target fuel injection amount when the combustion product has accumulated on the injection hole inlet area as the inlet deposit and then, a fuel injection command value corresponding to this target fuel injection amount is supplied to the fuel injector, the fuel having the base fuel injection amount is not injected from the fuel injector due to the inlet deposit. That is, the fuel injection amount error occurs. On the other hand, the inlet deposit is constituted mainly by the carbonate or the oxalate and the carbonate or the oxalate is difficultly removed by the relatively small increase of the fuel injection pressure. However, even if the inlet deposit has accumulated on the injection hole inlet area as the fuel injection amount error becomes relatively large and then, it is necessary to relatively largely increase the fuel injection pressure, it may be desired to remove the inlet deposit from the injection hole inlet area by increasing the fuel injection pressure. Therefore, if it is judged that it is desired to positively remove the inlet deposit from the injection hole inlet area, it is desired to remove the inlet deposit from the injection hole inlet area by the increase of the fuel injection pressure. In the third fuel injection pressure control, when the inlet deposit accumulation amount is relatively large and it is judged that it is necessary to remove the inlet deposit, the inlet deposit is removed from the injection hole inlet area by the increase of the fuel injection pressure. Therefore, the third fuel injection pressure control has an advantage that the fuel injection amount error can be made zero and therefore, the required torque can be output from the engine. Further, if the third fuel injection pressure control is applied to the case that the air-fuel ratio is controlled to a particular air-fuel ratio in order to maintain the particular property of the engine (for example, the property relating to the exhaust gas emission) high, there is an advantage that the fuel injection amount error can be made zero and therefore, the air-fuel ratio can be controlled to a particular air-fuel ratio and therefore, the particular property of the engine can be maintained high.

It should be noted that in consideration of the above-explained matter, the predetermined value for increasing the base fuel injection pressure (hereinafter, this value will be referred to as—predetermined increment—) is set as a value for increasing the fuel injection pressure to a pressure which can make the inlet deposit remove.

Further, in place of using the predetermined increment, a predetermined increase rate for increasing the base fuel injection pressure by a predetermined rate may be used. In this regard, the predetermined increment or increase rate may be a constant value or rate independently of the inlet deposit accumulation amount or may be a value or rate set in consideration of the inlet deposit accumulation amount. In this regard, in the case that the predetermined increment or decrease rate is set in consideration of the inlet deposit accumulation amount, the predetermined increment or increase rate may be set as follows.

That is, the deposit accumulating on the area remote from the wall face is subject to a high pressure from the fuel flowing through the fuel injection hole, compared with the deposit accumulating on the area near the wall face. Then, this pressure becomes a force for removing the deposit from the wall face (i.e. the remove force). In this regard, if the deposit has accumulated evenly on the injection hole inlet wall face, the thickness of the deposit from the injection hole inlet wall face is thin as the inlet deposit accumulation amount is large. Therefore, as the inlet deposit accumulation amount becomes large, the amount of the deposit accumulating on the area remote from the injection hole inlet wall face and therefore, the remove force exerted on the inlet deposit is large. Thus, if the fuel injection pressure is constant, the inlet deposit easily removes as the inlet deposit accumulation amount becomes large. In other words, as the inlet deposit accumulation amount becomes large, the inlet deposit can be removed by the small increase of the fuel injection pressure. Therefore, in the case that the predetermined increment or increase rate is set in consideration of the inlet deposit accumulation amount, the predetermined increment or increase rate is set as a value which becomes small as the inlet deposit accumulation amount becomes large.

Further, as the inlet deposit accumulation amount becomes large, the inlet deposit is easily removed and therefore, as the inlet deposit accumulation amount becomes small, the inlet deposit is difficulty removed. Therefore, in order to remove the inlet deposit when the inlet deposit accumulation amount is small, it is necessary to relatively largely increase the fuel injection pressure and there is a possibility that the inlet deposit cannot be removed even if the fuel injection pressure is relatively largely increased. In this regard, by setting the predetermined inlet deposit accumulation amount of the third fuel injection pressure control as an amount that the inlet deposit cannot be removed even if the fuel injection pressure is relatively largely increased, the useless performance of the increase of the fuel injection pressure for removing the inlet deposit can be avoided.

It should be noted that if the inlet deposit is not removed from the injection hole inlet area to the degree that the fuel injection amount error becomes zero, the actual fuel injection amount can be made close to the base fuel injection amount by removing the inlet deposit from the injection hole inlet area to the degree that the fuel injection amount error becomes small and this has an advantage. Therefore, in the third fuel injection pressure control, the predetermined increment or increase rate may be set as a value for removing the inlet deposit from the injection hole inlet area to the degree that the fuel injection amount error becomes small.

Next, a routine for performing the third fuel injection pressure control of the above-explained embodiment will be explained. An example of this routine is shown in FIG. 7. The routine shown in FIG. 7 is performed every time a predetermined time has elapsed.

When the routine shown in FIG. 7 starts, first, at the step 501, an inlet deposit accumulation amount TXDin is acquired. Next, at the step 502, it is judged if the inlet deposit accumulation amount TXDin acquired at the step 501 is equal to or larger than a predetermined inlet deposit accumulation amount TXDinth (TXDin≥TXDinth). When it is judged that TXDin≥TXDinth, the routine proceeds to the step 503. On the other hand, when it is judged that TXDin<TXDinth, the routine proceeds directly to the step 504.

When it is judged that TXDin≥TXDinth at the step 502 and then, the routine proceeds to the step 503, a correction for increasing the base fuel injection pressure Pb by a predetermined value is performed and then, the routine proceeds to the step 504.

In the case that the routine proceeds from the step 502 directly to the step 504, the base fuel injection pressure Pb is set directly as a target fuel injection pressure and then, a pump command value Pv corresponding to the target fuel injection pressure is set. On the other hand, in the case that the routine proceeds from the step 503 to the step 504, the base fuel injection pressure Pb increased at the step 503 is set as a target fuel injection pressure and then, a pump command value Pv corresponding to the target fuel injection pressure is set. Next, at the step 505, the pump command value Pv set at the step 504 is supplied to the fuel pump and then, the routine is terminated.

Next, a further embodiment of the fuel injection control of this invention will be explained. The fuel injection control of this embodiment is a control for controlling the fuel injection pressure and includes a control for compensating the decrease of the atomization degree of the injected fuel due to the outlet deposit. Below, this fuel injection control will be referred to as—fourth fuel injection pressure control—. In the fourth fuel injection pressure control, a pressure suitable for the fuel injection pressure when the inlet and output deposit accumulation amounts is previously obtained as a base fuel injection pressure. Then, when the outlet deposit accumulation amount is equal to or smaller than the inlet deposit accumulation amount during the engine operation, the base fuel injection pressure is set directly as a target fuel injection pressure and then, the fuel injection pressure is controlled to this target fuel injection pressure. On the other hand, when the outlet deposit accumulation amount is larger than the inlet deposit accumulation amount, the fuel injection pressure obtained by increasing the base fuel injection pressure by a predetermined value is set to a base fuel injection pressure and then, the fuel injection pressure is controlled to this target fuel injection pressure.

Next, the advantage of the fourth fuel injection pressure control will be explained. If the combustion product has accumulated on the injection hole outlet area as the outlet deposit, the atomization degree of the injected fuel decreases. On the other hand, if the fuel injection pressure is increased, the atomization degree of the injected fuel increases. However, if the inlet deposit accumulation amount is large, the increase of the atomization degree of the injected fuel by the increase of the fuel injection pressure becomes small. Then, this is distinguished when the inlet deposit accumulation amount is larger than the outlet deposit accumulation amount. That is, the increase efficiency of the atomization degree of the injected fuel by the increase of the fuel injection pressure is low. Therefore, adversely, when the outlet deposit accumulation amount is larger than the inlet deposit accumulation amount, the increase efficiency of the atomization degree of the injected fuel by the increase of the fuel injection pressure is high. In the fourth fuel injection pressure control, when the outlet deposit accumulation amount is larger than the inlet deposit accumulation amount and the increase efficiency of the atomization degree of the injected fuel by the increase of the fuel injection pressure is high, the fuel injection pressure is increased. Therefore, the fourth fuel injection pressure control has an advantage that the atomization degree of the injected fuel can be maintained at a predetermined atomization degree efficiently and therefore, the property relating to the exhaust gas emission of the engine can be maintained at a predetermined property efficiently.

It should be noted that in consideration of the above-explained matter, the predetermined value for increasing the base fuel injection pressure (hereinafter, this value will be referred to as—predetermined increment—) is set as a value for increasing the fuel injection pressure to a pressure which can compensate the decrease of the atomization degree of the injected fuel due to the outlet deposit.

Further, in place of using the predetermined increment, a predetermined increase rate for increasing the base fuel injection pressure by a predetermined rate may be used. Then, the predetermined increment or increase rate may be a constant value or rate independently of the outlet deposit accumulation amount or may be a value or rate set in consideration of the outlet deposit accumulation amount. In this regard, in the case that the predetermined increment or increase rate is set in consideration of the outlet deposit accumulation amount, the decrease of the atomization degree of the injected fuel generally tends to become large as the outlet deposit accumulation amount becomes large and therefore, the predetermined increment or increase rate may be set as a large value as the outlet deposit accumulation amount becomes large.

It should be noted that although the fuel injection pressure is not increased such that the decrease of the atomization degree of the injected fuel becomes zero, the increase of the fuel injection pressure has at least an advantage that the atomization degree of the injected fuel is improved. Therefore, in the fourth fuel injection pressure control, the predetermined increment or increase rate may be set as a value for increasing the fuel injection pressure.

Figure 8:
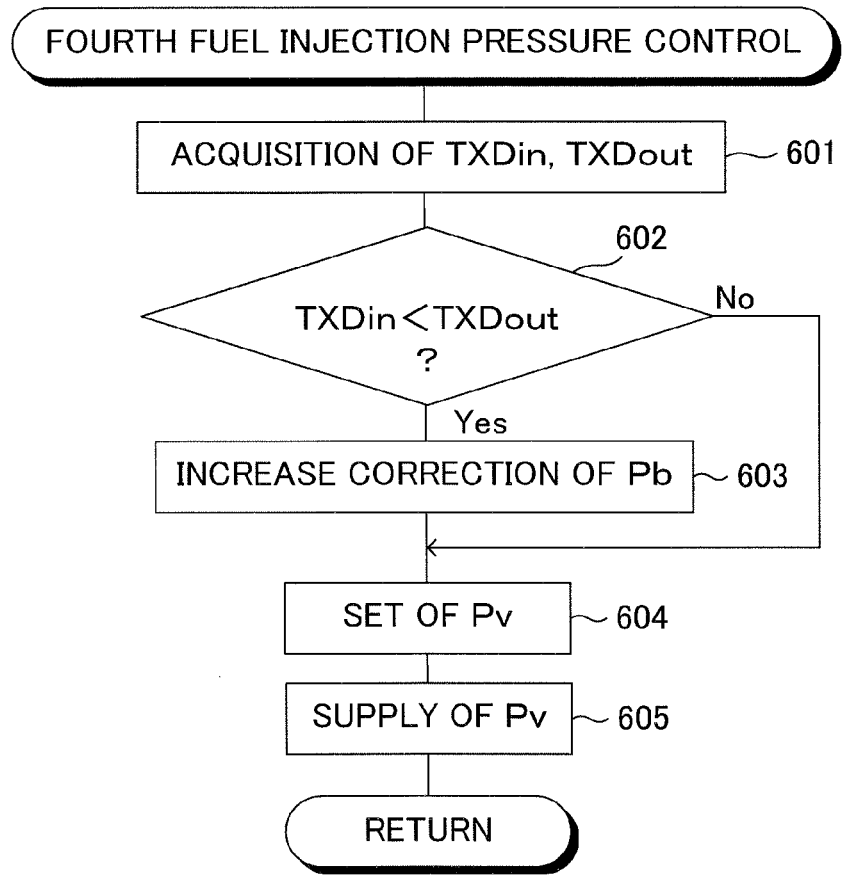
FIG. 8 is a view showing an example of a routine for performing a fourth fuel injection pressure control according to the invention.

Next, a routine for performing the fourth fuel injection pressure control of the above-identified embodiment will be explained. An example of this routine is shown in FIG. 8. The routine shown in FIG. 8 is performed every time a predetermined time has elapsed.

When the routine shown in FIG. 8 starts, first, at the step 601, inlet and outlet deposit accumulation amounts TXDin and TXDout are acquired. Next, at the step 602, it is judged if the outlet deposit accumulation amount TXDout acquired at the step 601 is larger than the inlet deposit accumulation amount TXDin acquired at the step 601 (TXDin<TXDout). When it is judged that TXDin<TXDout, the routine proceeds to the step 603. On the other hand, when it is judged that TXDin≥TXDout, the routine proceeds to the step 604.

When it is judged that TXDin<TXDout at the step 602 and then, the routine proceeds to the step 603, a correction for increasing the base fuel injection pressure Pb by a predetermined value is performed and then, the routine proceeds to the step 604.

In the case that the routine proceeds from the step 602 directly to the step 604, the base fuel injection pressure Pb is set directly as a target fuel injection pressure and then, a pump command value Pv corresponding to the target fuel injection pressure is set. On the other hand, in the case that the routine proceeds from the step 603 to the step 604, the base fuel injection pressure increased at the step 603 is set as a target fuel injection pressure and then, a pump command value Pv corresponding to the target fuel injection pressure is set. Next, at the step 605, the pump command value Pv set at the step 604 is supplied to the fuel pump and then, the routine is terminated.

Next, a further embodiment of the fuel injection control of this invention will be explained. The fuel injection control of this embodiment is a control for controlling the fuel injection pressure and includes a control for removing the outlet deposit from the injection hole outlet area. Below, this fuel injection control will be referred to as—fifth fuel injection pressure control—. In this fifth fuel injection pressure control, a pressure suitable as the fuel injection pressure when the inlet and outlet deposit accumulation amounts are zero is previously obtained as a base fuel injection pressure. Further, a smallest amount among the inlet deposit accumulation amounts which does not cause the sufficient remove of the outlet deposit even if the fuel injection pressure is increased is previously obtained as a predetermined inlet deposit accumulation amount and a smallest amount among the outlet deposit accumulation amounts which causes a necessity for removing the outlet deposit is previously obtained as a predetermined outlet deposit accumulation amount (this amount may be zero). Then, when the inlet deposit accumulation amount is larger than the predetermined inlet deposit accumulation amount independently of the outlet deposit accumulation amount during the engine operation or the outlet deposit accumulation amount is smaller than the predetermined outlet deposit accumulation amount independently of the inlet deposit accumulation amount during the engine operation, the base fuel injection pressure itself is set to a target fuel injection pressure and then, the fuel injection pressure is controlled to this target fuel injection pressure. On the other hand, when the inlet deposit accumulation amount is equal to or smaller than the predetermined inlet deposit accumulation amount and the outlet deposit accumulation amount is equal to or larger than the predetermined outlet deposit accumulation amount, a fuel injection pressure obtained by increasing the base fuel injection pressure by a predetermined value is set to a target fuel injection pressure and then, the fuel injection pressure is controlled to this target fuel injection pressure.

Next, the advantage of the fifth fuel injection pressure control will be explained. If the combustion product has accumulated on the injection hole outlet area as the outlet deposit, the atomization degree of the injected fuel decreases. On the other hand, the outlet deposit is mainly constituted by the lower carboxylate and this lower carboxylate can be removed by the relatively small increase of the fuel injection pressure. Then, if the outlet deposit is removed from the injection hole outlet area, the atomization degree of the injected fuel is improved. However, if the inlet deposit accumulation amount is large, the remove amount of the outlet deposit by the increase of the fuel injection pressure decreases. That is, if the inlet deposit accumulation amount is large, the remove efficiency of the outlet deposit by the increase of the fuel injection pressure is low. Therefore, adversely, if the inlet deposit accumulation amount is small, the remove efficiency of the outlet deposit by the increase of the fuel injection pressure is high. In the fifth fuel injection pressure control, when the inlet deposit accumulation amount is relatively small, the outlet deposit accumulation amount is relatively large and the increase efficiency of the atomization degree of the injected fuel by the increase of the fuel injection pressure is high, the fuel injection pressure is increased. Therefore, the fifth fuel injection pressure control has an advantage that the atomization degree of the injected fuel is improved efficiently and therefore, the property relating to the exhaust gas emission of the engine is improved efficiently.

It should be noted that in consideration of the above-explained matter, the predetermined value for increasing the base fuel injection pressure (hereinafter, this value will be referred to as—predetermined increment—) is set as a value for increasing the fuel injection pressure to a pressure that the outlet deposit is removed under the condition that the inlet deposit accumulation amount is equal to or smaller than the predetermined inlet deposit accumulation amount.

Further, in place of using the predetermined increment, a predetermined increase rate for increasing the base fuel injection pressure by a predetermined rate may be used. Then, the predetermined increment or increase rate may be a constant value or rate independently of the outlet deposit accumulation amount or may be a value or rate set in consideration of the outlet deposit accumulation amount. In this regard, in the case that the predetermined increment or increase rate is set in consideration of the outlet deposit accumulation amount, the predetermined increment or increase rate may be set as follows.

That is, the deposit accumulating on the area remote from the wall face is subject to a large pressure from the fuel flowing in the fuel injection hole, compared with the deposit accumulation on the area near the wall face. Then, this pressure becomes a force for removing the deposit from the wall face (i.e. a remove force). In this regard, if the deposit has accumulated evenly on the injection outlet wall face, the thickness of the deposit from the injection hole outlet wall face is large as the outlet deposit accumulation amount becomes large. Therefore, as the outlet deposit accumulation amount becomes large, the amount of the deposit accumulating on the area remote from the injection hole outlet wall face becomes large and therefore, the remove force exerting on the outlet deposit becomes large. Thus, even if the fuel injection pressure is constant, the outlet deposit is easily removed as the outlet deposit accumulation amount becomes large. In other words, as the outlet deposit accumulation amount becomes large, the outlet deposit can be removed by a small increase of the fuel injection pressure. Therefore, in the case that the predetermined increment or increase rate is set in consideration of the outlet deposit accumulation amount, the predetermined increment or increase rate may be set as a small value as the outlet deposit accumulation amount becomes large.

Further, as the outlet deposit accumulation amount becomes large, the outlet deposit is easily removed and therefore, as the outlet deposit accumulation amount becomes small, the outlet deposit is difficulty removed. Therefore, in order to remove the outlet deposit when the outlet deposit accumulation amount is small, it is necessary to relatively largely increase the fuel injection pressure and even if the fuel injection pressure is relatively largely increased, there is a possibility that the outlet deposit cannot be removed. In this regard, if the predetermined outlet deposit accumulation amount of the fifth fuel injection pressure control is set as an amount that the outlet deposit cannot be removed even if the fuel injection pressure is relatively largely increased, the useless performance of the increase of the fuel injection pressure in order to remove the outlet deposit is avoided.

It should be noted that although the outlet deposit is not removed from the injection hole area to a degree that the decrease of the atomization degree of the injected fuel, the remove of the outlet deposit from the injection hole outlet area has an advantage that the atomization degree of the injected fuel is removed. Therefore, in the fifth fuel injection pressure control, the predetermined increment or increase rate may be set as a value for removing the outlet deposit from the injection hole outlet area.

Next, a routine for performing the fifth fuel injection pressure control of the above-explained embodiment will be explained. An example of this routine is shown in FIG. 9. The routine shown in FIG. 9 is performed every time a predetermined time has elapsed.

When the routine shown in FIG. 9 starts, first, at the step 701, the inlet and outlet deposit accumulation amounts TXDin and TXDout are acquired. Next, at the step 702, it is judged if the inlet deposit accumulation amount TXDin acquired at the step 701 is equal to or smaller than the predetermined inlet deposit accumulation amount TXDinth (TXDin≤TXDinth) and the outlet deposit accumulation amount TXDout is equal to or larger than the predetermined outlet deposit accumulation amount TXDoutth (TXDout≥TXDoutth). When it is judged that TXDin≤TXDinth and TXDout≥TXDoutth, the routine proceeds to the step 703. On the other hand, when it is judged that TXDin>TXDinth or TXDout<TXDoutth, the routine proceeds directly to the step 704.

When it is judged that TXDin≤TXDinth and TXDout≥TXDoutth at the step 702 and then, the routine proceeds to the step 703, a correction for increasing the base fuel injection pressure Pb by a predetermined value is performed and then, the routine proceeds to the step 704.

In the case that the routine proceeds from the step 702 to the step 704, the base fuel injection pressure Pb itself is set to a target fuel injection pressure and then, a pump command value Pv corresponding to this target fuel injection pressure is set. On the other hand, in the case that the routine proceeds from the step 703 to the step 704, the base fuel injection pressure Pb increased at the step 703 is set to a target fuel injection pressure and then, a pump command value Pv corresponding to this target fuel injection pressure is set. Next, at the step 705, the pump command value Pv set at the step 704 is supplied to the fuel pump and then, the routine is terminated.

It should be noted that a fuel injection control obtained by suitably combining two or more of the fuel injection control among the above-explained fuel injection control (i.e. the fuel injection amount control and the first to fifth fuel injection pressure controls) is within the scope of this invention.

Next, an embodiment of the calculation of the injection hole temperature (in details, the injection hole inlet and outlet temperatures) of this invention will be explained. In one embodiment, the injection hole outlet temperature Tout is calculated according to the following formula 11.

$$Tout = a \times Ta \times \left(\frac{Pc\max}{Pa}\right)^{\frac{\kappa-1}{\kappa}} \qquad (11)$$

In the formula 11, "Ta" is the intake gas temperature (i.e. the temperature of the air sucked into the combustion chamber), "Pa" is the intake gas pressure (i.e. the pressure of the air sucked into the combustion chamber), "Pcmax" is the maximum cylinder pressure (i.e. the highest pressure among the pressures in the combustion chamber during one engine cycle), "κ" is the specific heat ratio of the air sucked into the combustion chamber and "a" is a conversion coefficient for converting the maximum cylinder temperature (i.e. the highest temperature among the temperatures in the combustion chamber during one engine cycle) to the injection hole outlet temperature.

Further, in another embodiment, the injection hole outlet temperature Tout is calculated according to the following formula 12.

$$Tout = a \times \left(Ta \times E^{\kappa-1} + \frac{b \times Ti + c \times Pi}{d \times Pa}\right) \qquad (12)$$

In the formula 12, "Ta" is the intake gas temperature, "Pa" is the intake gas pressure, "Ti" is the fuel injection timing (i.e. the timing of the injection of the fuel from the fuel injector during one engine cycle), "Pi" is the fuel injection pressure, "E" is the actual compression ratio, "κ" is the specific heat ratio of the air sucked into the combustion chamber, "a" is a conversion coefficient for converting the maximum cylinder temperature to the injection hole outlet temperature and "b", "c" and "d" are coefficients for calculating the increase of the cylinder temperature (i.e. the temperature in the combustion chamber) by the combustion of the fuel during one engine cycle from the fuel injection timing, the fuel injection pressure and the intake gas pressure.

Further, in one embodiment, the average injection hole temperature (i.e. the average temperature in the fuel injection hole) Tave is calculated according to the following formula 13.

$$Tave = a \times N + b \times Ti + c \times Pi + d \times TQ + e \times Tw + f \times Pa + g \qquad (13)$$

In the formula 13, "N" is the engine speed, "Ti" is the fuel injection timing, "Pi" is the fuel injection pressure, "TQ" is the engine torque, "Tw" is the cooling water temperature, "Pa" is the intake gas pressure and "a", "b", "c", "d", "e", "f" and "g" are coefficients for calculating the average injection hole temperature from the engine speed, fuel injection timing, fuel injection pressure, the engine torque, the cooling water temperature and the intake gas pressure.

Then, in one embodiment, the injection hole inlet temperature Tin is calculated according to the following formula 14.

$$Tin = Tave - (a \times Tout - Tave) \qquad (14)$$

In the formula 14, "Tave" is the average injection hole temperature calculated according to the formula 13, "Tout" is the injection hole outlet temperature calculated according to the formula 11 or 12 and "a" is a coefficient for calculating the injection hole inlet temperature according to the formula 14 on the basis of the average injection hole temperature and the injection hole outlet temperature.

Further, in another embodiment, the injection hole inlet temperature Tin is calculated according to the following formula 15.

$$Tin = Tave - \frac{(a \times Tout - Tave)}{b} \qquad (15)$$

In the formula 15, "Tave" is the average injection hole temperature calculated according to the formula 13, "Tout" is the injection hole outlet temperature calculated according to the formula 11 or 12 and "a" and "b" are coefficients for calculating the injection hole inlet temperature according to the formula 15 on the basis of the average injection hole temperature and the injection hole outlet temperature.

Figure 10:
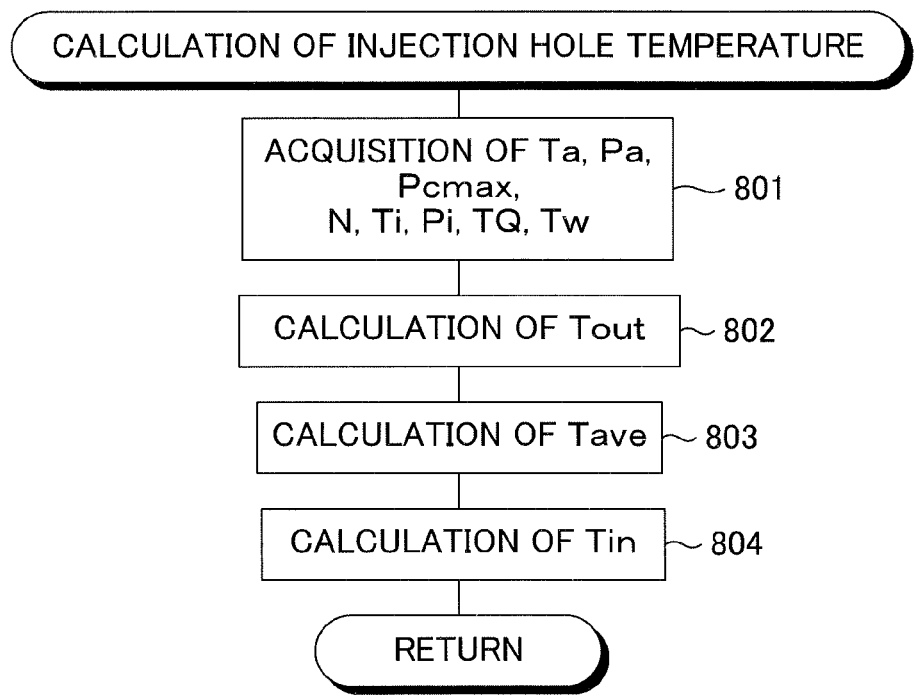
FIG. 10 is a view showing an example of a routine for performing a calculation of an injection hole temperature according to the invention.

Next, a routine for performing the calculation of the injection hole temperature of the above-explained embodiment will be explained. An example of this routine is shown in FIG. 10. The routine shown in FIG. 10 is performed every time a predetermined time has elapsed.

When the routine shown in FIG. 10 starts, first, at the step 801, the intake gas temperature Ta, the intake gas pressure Pa, the maximum cylinder pressure Pcmax, the engine speed N, the fuel injection timing Ti, the fuel injection pressure Pi, the engine torque TQ and the cooling water temperature Tw are acquired. Next, at the step 802, the injection hole outlet temperature Tout is calculated by applying the intake gas temperature Ta, the intake gas pressure Pa and the maximum cylinder pressure Pcmax acquired at the step 801 to the formula 11. Next, at the step 803, the average injection hole temperature Tave is calculated by applying the engine speed N, the fuel injection timing Ti, the fuel injection pressure Pi, the engine torque TQ, the cooling water temperature Tw and the intake gas pressure Pa acquired at the step 801 to the formula 13. Next, at the step 804, the injection hole inlet temperature Tin is calculated by applying the injection hole outlet temperature Tout calculated at the step 802 and the average injection hole temperature Tave calculated at the step 803 to the formula 14 or 15 and then, the routine is terminated.

Figure 11:
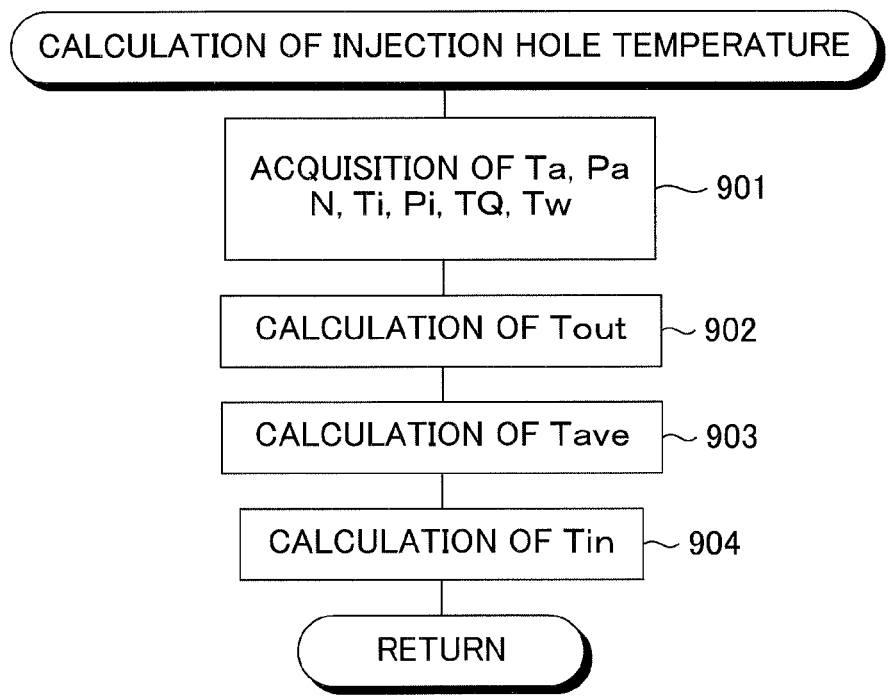
FIG. 11 is a view showing an example of a routine for performing a calculation of an injection hole temperature according to the invention.

Next, another routine for performing the calculation of the injection hole temperature of the above-explained embodiment will be explained. This routine is shown in FIG. 11. The routine shown in FIG. 11 is performed every time a predetermined time has elapsed.

When the routine shown in FIG. 11 starts, first, at the step 901, the intake gas temperature Ta, the intake gas pressure Pa, the engine speed N, the fuel injection timing Ti, the fuel injection pressure Pi, the engine torque TQ and the cooling water temperature Tw are acquired. Next, at the step 902, the injection hole outlet temperature Tout is calculated by applying the intake gas temperature Ta, the intake gas pressure Pa, the fuel injection timing Ti and the fuel injection pressure Pi to the formula 12. Next, at the step 903, the average injection hole temperature Tave is calculated by applying the engine speed N, the fuel injection timing Ti, the fuel injection pressure Pi, the engine torque TQ, the cooling water temperature Tw and the intake gas pressure Pa acquired at the step 901 to the formula 13. Next, at the step 904, the injection inlet temperature Tin is calculated by applying the injection outlet temperature Tout calculated at the step 902 and the average injection hole temperature Tave calculated at the step 903 to the formula 14 or 15 and then, the routine is terminated.

The invention claimed is:

1. A deposit accumulation amount estimation device estimating an inlet deposit accumulation amount and an outlet deposit accumulation amount by calculating those amounts, the inlet deposit accumulation amount being an amount of combustion product accumulating on an injection hole inlet area, the outlet deposit accumulation amount being an amount of combustion product accumulating on an injection hole outlet area, the inlet deposit accumulation amount being calculated by subtracting an inlet deposit remove amount calculated by a deposit remove amount estimation device from an inlet combustion product production amount calculated by a combustion product production amount estimation device, the outlet deposit accumulation amount being calculated by subtracting an outlet deposit remove amount calculated by the deposit remove amount estimation device from an outlet combustion product production amount calculated by the combustion product production amount estimation device, the deposit remove amount estimation device being a device for an internal combustion engine having a fuel injector, the deposit remove amount estimation device estimating the inlet deposit remove amount and the outlet deposit remove amount by calculating those amounts, the inlet deposit remove amount being an amount of removed combustion product among combustion product accumulating on an injection hole inlet area constituted by: an area being inside of a fuel injection hole of the fuel injector and being at an inlet side of the fuel injection hole; and an area being outside of the fuel injection hole and being adjacent to an inlet of the fuel injection hole, the outlet deposit remove amount being an amount of removed combustion product among combustion product accumulating on an injection hole outlet area constituted by: an area being inside of the fuel injection hole and being at an outlet side of the fuel injection hole; and an area being outside of the fuel injection hole and being adjacent to an outlet of the fuel injection hole, the inlet deposit remove amount being calculated on the basis of an inlet deposit accumulation amount defined as an amount of combustion product accumulating on the injection hole inlet area, the outlet deposit remove amount being calculated on the basis of an outlet deposit accumulation amount defined as an amount of combustion product accumulating on the injection hole outlet area, the combustion product production amount estimation device being a device for the internal combustion engine having the fuel injector, the combustion product production amount estimation device estimating the inlet combustion product production amount and the outlet combustion product production amount by calculating those amounts, the inlet combustion product production amount being an amount of combustion product produced due to the combustion of fuel at the injection hole inlet area, the outlet combustion product production amount being an amount of combustion product produced due to the combustion of fuel at the injection hole outlet area, the inlet combustion product production amount being calculated on the basis of a temperature of the injection hole inlet area, the outlet combustion product production amount being calculated on the basis of a temperature of the injection hole outlet area, the temperature of the injection hole inlet area and the temperature of the injection hole outlet area being obtained separately.

2. The deposit accumulation amount estimation device according to claim 1, wherein a temperature of decomposition of the combustion product accumulating on the injection hole inlet area being set as an inlet deposit decomposition temperature, the inlet deposit accumulation amount being calculated as zero upon a temperature of the injection hole inlet area being equal to or higher than the inlet deposit decomposition temperature.

3. The deposit accumulation amount estimation device according to claim 1, wherein a temperature of decomposition of the combustion product accumulating on the injection hole outlet area being set as an outlet deposit decomposition temperature, the outlet deposit accumulation amount being calculated as zero upon the temperature of the injection hole outlet area being equal to or higher than the outlet deposit decomposition temperature.

4. A fuel injection control device of an internal combustion engine including the deposit accumulation amount estimation device according to claim 1, the fuel injection control device providing a fuel injection command value toward a fuel injector to inject a fuel, the fuel injection command value being a command value to be provided toward the fuel injector to inject the fuel from the fuel injector, the fuel injection command value being set at a base fuel injection command value so as to correspond to a required fuel injection amount, the base fuel injection command value being provided to the fuel injector, the base fuel injection command value being corrected depending on an inlet deposit accumulation amount, the inlet deposit accumulation amount being calculated by the deposit accumulation amount estimation device.

5. A fuel injection control device of an internal combustion engine including the deposit accumulation amount estimation device according to claim 1, the fuel injection control device controlling a fuel injection pressure to a base fuel injection pressure set as a target fuel injection pressure, the fuel injection pressure being a pressure of fuel injected from a fuel injector, the base fuel injection pressure being increased upon an outlet deposit accumulation amount being larger than an inlet deposit accumulation amount, the fuel injection pressure being controlled to the increased base fuel injection pressure, the inlet deposit accumulation amount and the outlet deposit accumulation amount being calculated by the deposit accumulation amount estimation device.

6. A fuel injection control device of an internal combustion engine including the deposit accumulation amount estimation device according to claim 1, the fuel injection control device increasing a fuel injection pressure, defined as a pressure of fuel injected from a fuel injector, to a pressure allowing to remove a combustion product accumulating on an injection hole outlet area from the injection hole outlet area upon an inlet deposit accumulation amount being equal to or smaller than a predetermined inlet deposit accumulation amount and an outlet deposit accumulation amount being equal to or larger than a predetermined outlet deposit accumulation amount, the inlet deposit accumulation amount and the outlet deposit accumulation amount being calculated by the deposit accumulation amount estimation device.

* * * * *